(12) United States Patent
Shimanaka et al.

(10) Patent No.: US 9,260,589 B2
(45) Date of Patent: Feb. 16, 2016

(54) AQUEOUS PIGMENT DISPERSION LIQUID AND AQUEOUS PIGMENT INKJET INK USING SAME

(71) Applicant: DAINICHISEIKA COLOR & CHEMICALS MFG. CO., LTD., Tokyo (JP)

(72) Inventors: Hiroyuki Shimanaka, Tokyo (JP); Shinichiro Aoyagi, Tokyo (JP); Yoshikazu Murakami, Tokyo (JP); Katsuhiko Kanou, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 14/374,318

(22) PCT Filed: Feb. 8, 2013

(86) PCT No.: PCT/JP2013/053136
§ 371 (c)(1),
(2) Date: Jul. 24, 2014

(87) PCT Pub. No.: WO2013/122016
PCT Pub. Date: Aug. 22, 2013

(65) Prior Publication Data
US 2015/0011687 A1 Jan. 8, 2015

(30) Foreign Application Priority Data

Feb. 16, 2012 (JP) ................................. 2012-031222

(51) Int. Cl.
| | | |
|---|---|---|
| C09D 11/10 | (2014.01) | |
| C08K 5/3437 | (2006.01) | |
| C09B 67/08 | (2006.01) | |
| C09B 67/46 | (2006.01) | |
| C09D 11/106 | (2014.01) | |
| C09D 11/107 | (2014.01) | |
| C09D 11/326 | (2014.01) | |
| C08K 3/04 | (2006.01) | |
| C08K 5/053 | (2006.01) | |
| C08K 5/06 | (2006.01) | |
| C08K 5/23 | (2006.01) | |
| C08K 5/3417 | (2006.01) | |
| C09B 67/22 | (2006.01) | |

(52) U.S. Cl.
CPC .................. *C08K 5/3437* (2013.01); *C08K 3/04* (2013.01); *C08K 5/053* (2013.01); *C08K 5/06* (2013.01); *C08K 5/23* (2013.01); *C08K 5/3417* (2013.01); *C09B 67/009* (2013.01); *C09B 67/0013* (2013.01); *C09B 67/0033* (2013.01); *C09B 67/0041* (2013.01); *C09D 11/106* (2013.01); *C09D 11/107* (2013.01); *C09D 11/326* (2013.01)

(58) Field of Classification Search
CPC C09D 11/107; C09B 67/0009; C09B 7/0013; C08L 51/003
See application file for complete search history.

(56) References Cited

U.S. PATENT DOCUMENTS

2011/0223529 A1* 9/2011 Shimanaka et al. ....... 430/108.4
2013/0338273 A1 12/2013 Shimanaka et al.

FOREIGN PATENT DOCUMENTS

| JP | 2004-51971 | 2/2004 |
| JP | 2008-231130 | 10/2008 |
| JP | 2009-149912 | 7/2009 |
| WO | WO 2010/013651 | 2/2010 |
| WO | 2012/124212 | 9/2012 |

OTHER PUBLICATIONS

Extended European Search Report, Jul. 22, 2015; European Patent Application No. 13748957.1 (4 pages).

* cited by examiner

*Primary Examiner* — Vu A Nguyen
(74) *Attorney, Agent, or Firm* — Hamre, Schumann, Mueller & Larson, P.C.

(57) ABSTRACT

The present invention is an aqueous pigment dispersion liquid for inkjet comprising a pigment and a pigment dispersant. The pigment dispersant is at least any one of a graft copolymer and a block copolymer each comprising a polymer chain A and a polymer chain B, wherein the polymer chain A comprises 20 to 60 mass % of a constituent unit derived from a first cycloalkyl group-containing (meth)acrylate, 10 to 35 mass % of a constituent unit derived from (meth)acrylic acid, and 5 to 70 mass % of a constituent unit derived from another (meth)acrylate and the polymer chain B comprises at least any one of a constituent unit derived from a second cycloalkyl group-containing (meth)acrylate and a constituent unit derived from a vinyl monomer or (meth)acrylate having an aromatic ring.

14 Claims, No Drawings

AQUEOUS PIGMENT DISPERSION LIQUID AND AQUEOUS PIGMENT INKJET INK USING SAME

TECHNICAL FIELD

The present invention relates to a pigment dispersion liquid comprising a pigment as a colorant used for an aqueous pigment inkjet ink, and to an aqueous pigment inkjet ink obtained using the pigment dispersion liquid.

BACKGROUND ART

An inkjet printer covers a broad range of intended purposes such as personal use, office use, business use, recording use, color display use, and color photo use as a result of its high functionalization. Moreover, in order to correspond to speed enhancement and improvement in image quality, the advancement has been made to make ejected droplets (ink droplets) fine by improving devices. In order to make the ejected droplets fine, it is necessary to micronize a pigment (particle) in an ink and finely disperse the micronized pigment in a dispersion medium.

The clarity, color brightness, and color density of a printed matter are being improved by using an ink comprising a micronized pigment. Particularly, chroma being a color value to be an index to show the color brightness is improved by using an ink comprising a micronized pigment. Moreover, a gloss value is improved in the case where the recording is carried out on processed paper for inkjet (such as photo paper and paper for wide format printing). However, since the ink comprising a micronized pigment becomes liable to penetrate into the paper, the color developing property being a color density tends to be lowered.

Accordingly, studies on improving print density by suppressing the penetrability of an aqueous pigment ink, suppressing the wetting of the ink to the paper surface, and keeping the micronized pigment near the paper surface have been made in recent years. For example, attempts to coat (encapsulate) a pigment using a graft polymer or block polymer comprising a highly hydrophilic site and a highly hydrophobic site have been made. Since the pigment is coated by allowing the highly hydrophobic site to be adsorbed on the pigment surface, the penetration of the ink into the paper is suppressed and the pigment tends to be present on the paper surface. Moreover, since the highly hydrophilic site has affinity to a dispersion medium, the graft polymer or block polymer is supposed to take an elongated form. Therefore, it is considered that the storability of the ink is improved due to electrostatic repulsive force and repulsive force by steric hindrance (see Patent Literatures 1 to 3).

CITATION LIST

Patent Literature

Patent Literature 1: JP-A-2008-231130
Patent Literature 2: JP-A-2009-149912
Patent Literature 3: JP-A-2004-51971

SUMMARY OF INVENTION

Technical Problem

However, in the case where the particle diameter of the pigment is made large or the pigment is encapsulated to keep the pigment on the paper surface so that the color developing property of an image (printed matter) is improved, it sometimes occurs that the chroma or gloss of the printed matter is lowered. Therefore, it has been extremely difficult to prepare an ink capable of obtaining a printed matter in which a high color developing property is compatible with high chroma and high gloss.

The present invention has been made in consideration of the problem of the conventional technique as described above, and a subject of the present invention is to provide an aqueous pigment dispersion liquid capable of preparing an aqueous pigment inkjet ink that is capable of producing a printed matter having a high color developing property, high chroma, and high gloss and is excellent in the storability, and other subjects of the present invention are to provide an aqueous pigment inkjet ink obtained using the aqueous pigment dispersion liquid and to provide a method for preparing a dispersant-coated pigment suitable for obtaining the aqueous pigment dispersion liquid.

Solution to Problem

The present inventors have made diligent studies to achieve the above subjects to find that the problem can be solved by using, as a pigment dispersant, a graft copolymer or block copolymer having a prescribed structure obtained using particular monomer components as constituent units, and have completed the present invention.

Namely, according to the present invention, the aqueous pigment dispersion liquid shown below is provided.

[1] An aqueous pigment dispersion liquid for inkjet comprising 5 to 35 mass % of a pigment, 0.5 to 25 mass % of a pigment dispersant, 5 to 30 mass % of an aqueous organic solvent, and 20 to 80 mass % of water, wherein the pigment dispersant is at least any one of a graft copolymer in which a polymer chain A is grafted onto a polymer chain B and a block copolymer in which one end of the polymer chain A is linked to one end of the polymer chain B; the polymer chain A comprises 20 to 60 mass % of a constituent unit derived from a first cycloalkyl group-containing (meth)acrylate, 10 to 35 mass % of a constituent unit derived from (meth)acrylic acid, and 5 to 70 mass % of a constituent unit derived from another (meth)acrylate, and the polymer chain A has a number average molecular weight of 1,000 to 10,000; the polymer chain B comprises at least any one of a constituent unit derived from a second cycloalkyl group-containing (meth)acrylate and a constituent unit derived from a vinyl monomer or (meth)acrylate having an aromatic ring; a mass ratio of the polymer chain A to the polymer chain B satisfies A:B=30 to 70:70 to 30; and the graft copolymer and the block copolymer have a number average molecular weight of 2,000 to 20,000.

[2] The aqueous pigment dispersion liquid according to [1], wherein the pigment is at least one selected from the group consisting of Color Index number (C.I.) Pigment Blue 15:3 and 15:4, C.I. Pigment Red 122 and 269, C.I. Pigment Violet 19, C.I. Pigment Yellow 74, 155, and 180, C.I. Pigment Green 36 and 58, C.I. Pigment Orange 43, and C.I. Pigment Black 7, and the pigment has a number average primary particle diameter of less than 150 nm.

[3] The aqueous pigment dispersion liquid according to [1] or [2], wherein the aqueous organic solvent has a solubility to water of 20 mass % or more at 25° C. and is at least one selected from the group consisting of poly(n=1 or more) alkylene(C2 to 3) glycol monoalkyl ethers, poly(n=1 or more) alkylene(C2 to 3) glycol monoaryl ethers, poly(n=1 or more) alkylene(C2 to 3) glycol dialkyl ethers, alkylene diols, alkylene monool monoalkyl ethers, alkylene polyols, and amide solvents.

[4] The aqueous pigment dispersion liquid according to any one of [1] to [3], wherein coating treatment is applied to the pigment with the pigment dispersant.

[5] The aqueous pigment dispersion liquid according to any one of [1] to [4], wherein the first cycloalkyl group-containing (meth)acrylate is at least any one of cyclohexyl (meth)acrylate and 3,3,5-trimethylcyclohexyl (meth)acrylate.

Moreover, according to the present invention, an aqueous pigment inkjet ink shown below is provided.

[6] An aqueous pigment inkjet ink comprising the aqueous pigment dispersion liquid according to any one of [1] to [5], wherein a content ratio of the pigment is 4 to 10 mass %.

Furthermore, according to the present invention, a method for preparing a dispersant-coated pigment shown below is provided.

[7] A method for preparing a dispersant-coated pigment to which dispersant-coated pigment coating treatment is applied with a pigment dispersant comprising: (i) a step of precipitating the pigment dispersant by adding an acid to a pigment dispersion liquid obtained by mixing a pigment, the pigment dispersant, an aqueous organic solvent, water, and an alkaline agent, or (ii) a step of precipitating the pigment dispersant by adding a kneaded product obtained by kneading the pigment and the pigment dispersant to a poor solvent for the pigment dispersant, wherein the pigment dispersant is at least any one of a graft copolymer in which a polymer chain A is grafted onto a polymer chain B and a block copolymer in which one end of the polymer chain A is linked to one end of the polymer chain B; the polymer chain A comprises 20 to 60 mass % of a constituent unit derived from a first cycloalkyl group-containing (meth)acrylate, 10 to 35 mass % of a constituent unit derived from (meth)acrylic acid, and 5 to 70 mass % of a constituent unit derived from another (meth)acrylate, and the polymer chain A has a number average molecular weight of 1,000 to 10,000; the polymer chain B comprises at least any one of a constituent unit derived from a second cycloalkyl group-containing (meth)acrylate and a constituent unit derived from a vinyl monomer or (meth)acrylate having an aromatic ring; a mass ratio of the polymer chain A to the polymer chain B satisfies A:B=30 to 70:70 to 30; and the graft copolymer and the block copolymer have a number average molecular weight of 2,000 to 20,000.

Advantageous Effects of Invention

The aqueous pigment dispersion liquid of the present invention comprises, as a pigment dispersant, at least any one of a graft copolymer and a block copolymer each having a water soluble polymer chain A in which a cycloalkyl group is introduced. Since the graft copolymer and the block copolymer have a hydrophobic cycloalkyl group, the graft copolymer and the block copolymer have properties that the glass transition point (Tg) is high and the refractive index as well as the light fastness is high. Thus, when the aqueous pigment dispersion liquid of the present invention using the graft copolymer or the block copolymer as a pigment dispersant is used, an aqueous pigment inkjet ink that is capable of producing a printed matter having a high color developing property, high chroma, and high gloss and is excellent in the storability can be prepared.

Moreover, since the polymer chain B has an aromatic ring and/or a cycloalkyl group, the polymer chain B is easily adsorbed on the hydrophobic pigment surface and steric repulsion occurs between the polymer chain A dissolved in water and the polymer chain B. Thereby, the steric repulsion contributes to the stabilization of the pigment dispersion. The water insoluble polymer chain B is not dissolved in an ink and forms a particle instead, thereby the viscosity of the ink is reduced and the ink exhibits Newtonian viscosity, and, as a result thereof, the ejection stability of the ink is improved. In addition, since the water soluble polymer chain A has a carboxyl group neutralized with an alkali, the ink is easily redissolved, redispersed, and exhibits a favorable ejection property even when, for example, the ink is dried in the inkjet head. From the above reasons, the aqueous pigment inkjet ink using the aqueous pigment dispersion liquid of the present invention contributes to enhancing the speed of printing and improving the quality of a printed matter in inkjet printing.

DESCRIPTION OF EMBODIMENTS

Hereinafter, embodiments of the present invention will be described, however the present invention is not limited to the following embodiments. The aqueous pigment dispersion liquid of the present invention is an aqueous pigment dispersion liquid for inkjet comprising a pigment, a pigment dispersant, an aqueous organic solvent, and water. Hereinafter, the details of the aqueous pigment dispersion liquid will be described.

(Pigment Dispersant)

The pigment dispersant is at least any one of a graft copolymer in which a polymer chain A is grafted onto a polymer chain B and a block copolymer in which one end of a polymer chain A is linked to one end of a polymer chain B. The graft copolymer has one or more polymer chains A linked to (branched from) the polymer chain B that is the main chain. In addition, the number of polymer chains A linked to the polymer chain B per one polymer chain B is not limited. The polymer chain A comprises 20 to 60 mass % of a constituent unit derived from a first cycloalkyl group-containing (meth)acrylate, 10 to 35 mass % of a constituent unit derived from (meth)acrylic acid, and 5 to 70 mass % of a constituent unit derived from another (meth)acrylate. The carboxyl group contained in the constituent unit derived from (meth)acrylic acid is ionized by being neutralized with an alkali. Therefore, the polymer chain A comprising a constituent unit derived from (meth)acrylic acid is a polymer chain having a water soluble property.

The polymer chain B comprises at least any one of a constituent unit derived from a second cycloalkyl group-containing (meth)acrylate and a constituent unit derived from a vinyl monomer having an aromatic ring, and a constituent unit derived from another (meth)acrylate, the constituent unit being used as necessary. The polymer chain B is a water insoluble polymer chain, is adsorbed on the pigment by hydrophobic interaction, is deposited on the pigment, and coats (encapsulates) the pigment. The pigment can be dispersed in a favorable state by using a pigment dispersant having the polymer chain A and the polymer chain B each having such a different property. In addition, the first cycloalkyl group-containing (meth)acrylate that constitutes the polymer chain A and the second cycloalkyl group-containing (meth)acrylate that constitutes the polymer chain B may be the same or different. Hereinafter, when just the term "cycloalkyl group-containing (meth)acrylate" is used, the term means both of "the first cycloalkyl group-containing (meth)acrylate" and "the second cycloalkyl group-containing (meth)acrylate".

The polymer chain B forms a particle, and the polymer chain A is dissolved and stabilized in the aqueous medium of the ink. Therefore, the pigment dispersant forms a particle having high stability to make the viscosity of the ink low, and therefore the dispersion stability of the pigment and the ejection property of the ink are not inhibited. Furthermore, since the amount of the carboxyl group in the polymer chain A is appropriately controlled, the pigment dispersant has high solubility to water. Therefore, even when the ink is dried in the inkjet head, the dried ink can easily be redissolved and redispersed by another aqueous medium such as, for example, a cleaning liquid.

(Polymer Chain A)

A cycloalkyl group is contained in the polymer chain A. It becomes possible to prepare an aqueous pigment ink that is capable of producing a printed matter having a high color developing property, high chroma, and high gloss by using a pigment dispersant comprising a polymer chain A having a cycloalkyl group. Specific examples of the first cycloalkyl group-containing (meth)acrylate include cyclohexyl (meth) acrylate, methylcyclohexyl (meth)acrylate, 3,3,5-trimethyl-cyclohexyl (meth)acrylate, t-butylcyclohexyl (meth)acrylate, cyclohexyloxyethyl (meth)acrylate, tricyclodecyl (meth) acrylate, and isobornyl (meth)acrylate are preferable. Above all, cyclohexyl (meth)acrylate and 3,3,5-trimethyl cyclohexyl (meth)acrylate are preferable. Moreover, it is preferable that the number of carbon atoms of the cycloalkyl group is 6 to 9. The reason is because the cycloalkyl group having a number of carbon atoms of 6 to 9 does not inhibit the water solubility so much when introduced by a large amount and is readily available.

When the ratio of the constituent unit contained in the polymer chain A and derived from the first cycloalkyl (meth) acrylate is less than 20 mass %, the constituent unit does not exhibit its effect. On the other hand, when the ratio of the constituent unit exceeds 60 mass %, it sometimes occurs that the water solubility is remarkably lowered. In addition, it is preferable that the ratio of the constituent unit contained in the polymer chain A and derived from the first cycloalkyl (meth) acrylate is 30 to 50 mass %.

A constituent unit derived from (meth)acrylic acid is contained in the polymer chain A. The carboxyl group in the constituent unit is neutralized and ionized, and the polymer chain A is to be dissolved in water. When the ratio of the constituent unit contained in the polymer chain A and derived from (meth)acrylic acid is less than 10 mass %, it sometimes occurs that the polymer chain A is not dissolved in water. On the other hand, when the ratio of the constituent unit exceeds 35 mass %, it sometimes occurs that the hydrophilicity of the polymer chain A becomes too high and the water resistance of the obtained printed matter is remarkably lowered. It is preferable that the ratio of the constituent unit contained in the polymer chain A and derived from (meth)acrylic acid is 15 to 25 mass %.

"A constituent unit derived from another (meth)acrylate" is contained in the polymer chain A. Specific examples of another (meth)acrylate include aliphatic alkyl (meth)acrylates such as methyl (meth)acrylate, butyl (meth)acrylate, and dodecyl (meth)acrylate; aromatic (meth)acrylates such as phenyl (meth)acrylate and benzyl (meth)acrylate; hydroxyl group-containing (meth)acrylates such as 2-hydroxyethyl (meth)acrylate and 2-hydroxypropyl (meth)acrylate; ether group- or chain-containing (meth)acrylates such as (poly) ethylene glycol monoalkyl ether (meth)acrylates; and amino group-containing (meth)acrylates such as dimethylaminoethyl (meth)acrylate. In addition, another (meth)acrylate may be used alone or in combination of two or more kinds.

The number average molecular weight of the polymer chain A is 1,000 to 10,000, preferably 2,000 to 7,000. When the number average molecular weight of the polymer chain A is less than 1,000, the performance as a polymer is not exhibited. On the other hand, when the number average molecular weight of the polymer chain A exceeds 10,000, the ratio of the hydrophilic chain to the pigment dispersant is too large and the desorption of the polymer chain B from the pigment is facilitated, and, as a result thereof, it sometimes occurs that the dispersion stability of the pigment is lowered. In addition, the number average molecular weight of the polymer chain or polymer in the present description is a molecular weight in terms of polystyrene measured by gel permeation chromatography (hereinafter, also written as "GPC").

(Polymer Chain B)

The polymer chain B is a water insoluble polymer chain and has adsorptivity to the pigment. Therefore, the polymer chain B is adsorbed to the pigment, and is deposited on the surface to coat (encapsulate) the pigment. Specific examples of the second cycloalkyl group-containing (meth)acrylate include similar compounds listed as afore-mentioned specific examples of the first cycloalkyl group-containing (meth) acrylate. It is preferable that the ratio of the constituent unit derived from the second cycloalkyl (meth)acrylate contained in the polymer chain B is 30 to 70 mass %, more preferably 40 to 60 mass %.

Specific examples of the vinyl monomer having an aromatic ring include styrene, vinyl toluene, and vinyl naphthalene. Moreover, specific examples of the (meth)acrylate having an aromatic ring include phenyl (meth)acrylate, naphthoxy (meth)acrylate, benzyl (meth)acrylate, phenoxy ethyl (meth)acrylate, and para-cumyl phenol ethylene oxide-modified (meth)acrylate. It is preferable that the ratio of the constituent unit derived from the vinyl monomer or (meth) acrylate contained in the polymer chain B and having an aromatic ring is 30 to 70 mass %, more preferably 40 to 60 mass %.

In addition, it is preferable that the afore-mentioned "constituent unit derived from another (meth)acrylate" is contained in the polymer chain B for the purpose of softening the polymer chain B or introducing a functional group such as a hydroxyl group.

The number average molecular weight of both of the graft copolymer and the block copolymer each used as a pigment dispersant is 2,000 to 20,000, preferably 5,000 to 15,000, more preferably 7,000 to 12,000. When the number average molecular weight is less than 2,000, the function as a pigment dispersant is lowered and the dispersion stability is not maintained. On the other hand, when the number average molecular weight exceeds 20,000, it sometimes occurs that the viscosity of the aqueous pigment dispersion liquid becomes high or one polymer chain is adsorbed to a plurality of pigment particles to inhibit the dispersion process.

When the ratio of the polymer chain A being a hydrophilic chain and contained in the graft copolymer or block copolymer is too small, the pigment dispersant becomes water insoluble or precipitates. On the other hand, when the ratio of the polymer chain A is too large, the water resistance of the printed matter that is recorded is lowered or the adsorptivity to a pigment is lowered. Moreover, when the ratio of the polymer chain B being a hydrophobic chain and contained in the graft copolymer or the block copolymer is too small, the pigment dispersant is not stably adsorbed to the pigment. On the other hand, when the ratio of the polymer chain B is too large, the pigment dispersant becomes water insoluble or separates. Thus, the mass ratio of the polymer chain A to the polymer chain B satisfies A:B=30 to 70:70 to 30, preferably 40 to 60:60 to 40, more preferably 40 to 50:50 to 40.

(Method for Synthesizing Graft Copolymer)

The graft copolymer can be synthesized in accordance with a conventionally known method. Specific examples of the method for synthesizing the graft copolymer include (i) a method for polymerizing a macromonomer (polymer chain A) to one end of which a radical polymerizable unsaturated bond is introduced and a monomer being a constituent of the polymer chain B (a macromonomer method); (ii) a method for polymerizing a monomer being a constituent of the polymer chain A under the presence of the polymer chain B to which a polymerization initiating-group is linked (a side chain polymerization method); and (iii) a method for reacting the polymer chain A with the polymer chain B after preparing the polymer chain A to one end of which a reactive group "X" is introduced and the polymer chain B obtained by polymerizing a monomer having a functional group "Y" capable of reacting with the reactive group "X", the polymer chain B having the functional group "Y" in the side chain thereof (a polymer reaction method). The graft copolymer can be synthesized by any of the above synthesis methods, however the macromonomer method is preferable among others.

There is a possibility that the side chain polymerization method causes gelation or the like in the case where a coupling reaction being a side reaction of radical polymerization occurs. Moreover, the polymer reaction method is a reaction between polymers, and since the concentration of the reactive group is low, the reaction rate is low, and therefore it sometimes occurs that the polymer chain A and the polymer chain B are left alone respectively. However, there sometimes occurs the case that the polymer reaction method is preferable because the reactivity of an end group becomes uniform by adjusting the molecular weights of the polymers in a predetermined range through a living radical polymerization method described later to thereby obtain the graft copolymer easily.

The macromonomer can be synthesized in accordance with a conventionally known method. Specific examples for synthesizing the macromonomer include (i) a method for introducing an unsaturated bond to an end by polymerizing a meth(acrylate) or the like accompanied by depolymerization at a high temperature and a high pressure; (ii) a method for introducing a hydroxyl group to an end using a chain transfer agent having a functional group such as a thiol group and a hydroxyl group and thereafter reacting a monomer having a functional group capable of reacting with the introduced hydroxyl group; (iii) a method for performing irreversible addition-cleavage chain transfer polymerization using, as a chain transfer agent, a vinyl monomer having a group easily dissociable group as a radical at an α position (examples: α-bromomethyl acrylate compounds, an α-methyl styrene dimer, a methyl methacrylate dimer); and (iv) a method for obtaining a polymer using a polymerization initiating compound having a functional group such as a hydroxyl group and halogen in the living radical polymerization described later, then adding a compound having an unsaturated bond capable of reacting with the functional group, and obtaining a macromonomer by introducing the unsaturated bond to an end of the polymer.

The intended graft copolymer can be obtained by polymerizing the macromonomer obtained by the manner as described above and the monomer being a constituent of the polymer chain B in accordance with a conventionally known method such as an ordinary radical polymerization method and a living radical polymerization method described later.

(Method for Synthesizing Block Copolymer)

It is difficult to obtain the block copolymer by a conventionally known radical polymerization method. The block copolymer can be obtained by preparing the polymer chain A to one end of which a functional group "X" is introduced and the polymer chain B at one end of which a functional group "Y" capable of reacting with the functional group "X" is introduced and thereafter reacting the functional group "X" and the functional group "Y" of these polymer chains. However, it sometimes occurs that a large amount of the polymer chain A or polymer chain B is left because the reaction rate is low. Examples of the preferable method for synthesizing the block copolymer include a living cationic polymerization method, a living anionic polymerization method, and a living radical polymerization method. However, there sometimes occurs the inconvenience that (meth)acrylate is not polymerized or the like in the living cationic polymerization method and the living anionic polymerization method. Therefore, the living radical polymerization method is particularly preferable as a method for synthesizing the block copolymer.

Specific examples of the living radical polymerization method include (i) a method using a compound capable of producing a nitroxide radical (an NMP method); (ii) a method using a metal complex such as a copper complex and a ruthenium complex, further using a halogenated compound as a polymerization initiating compound, and causing polymerization to occur from the polymerization initiating compound in a living manner (an ATRP method); (iii) a method using a dithiocarboxylic ester or xanthate compound (an RAFT method); (iv) a method using an organic tellurium compound as a polymerization initiating compound (a TERP method); and (v) a method using an iodine compound as a polymerization initiating compound and further using a phosphorus compound, a nitrogen compound, a carbon compound, an oxygen compound, or the like as a catalyst (an RTCP method).

The above living radical polymerization methods can be carried out under a conventionally known polymerization condition. For example, the living polymerization may be carried out under the condition of bulk polymerization, suspension polymerization, emulsion polymerization, solution polymerization, or the like. In addition, in the case of solution polymerization, the reaction liquid after polymerization may be used as it is as a solution of a pigment dispersant, the solvent used for the polymerization may be replaced with another solvent, or only the block copolymer may be taken out by precipitating the block copolymer temporarily in a poor solvent. Among others, it is preferable that solution polymerization is carried out using an organic solvent contained in an inkjet ink as a solvent for polymerization. Thereby, the block copolymer can be used with ease as a pigment dispersant by simply neutralizing the block copolymer with an alkali being added to the reaction liquid after polymerization.

The pigment dispersant can be obtained by neutralizing (solubilizing to water) the graft copolymer or block copolymer obtained as described above with an alkali. Specific examples of the alkali include ammonia; alkylamines such as trimethylamine and triethylamine; glycol amines such as diethanolamine and triethanolamine; cyclic amines such as morpholine and pyridine; and hydroxides such as sodium hydroxide and potassium hydroxide. It is preferable that the use amount of the alkali is equal to or more than the equimolar of the carboxyl group contained in the graft copolymer or block copolymer.

(Pigment)

As the pigment, one or two or more kinds of organic pigments, inorganic pigments, or the like can be used. Specific examples of the pigment include carbon black, quinacridone pigments, phthalocyanine pigments, benzimidazolone pigments, isoindolinone pigments, and azo pigments. More specifically, it is preferable from the viewpoints of color developing properties, dispersibility, and weatherability that the pigment is, as expressed by Color Index number (C.I.), at least one selected from the group consisting of C.I. Pigment Blue 15:3 and 15:4, C.I. Pigment Red 122 and 269, C.I. Pigment Violet 19, C.I. Pigment Yellow 74, 155, and 180, C.I. Pigment Green 36 and 58, C.I. Pigment Orange 43, and C.I. Pigment Black 7.

Moreover, it is preferable that the number average primary particle diameter of the pigment is less than 150 nm. By using the pigment the number average primary particle diameter of which is less than 150 nm, the optical density, the chroma, the color developing properties, and the print quality of the printed matter that is recorded can be improved, and the sedimentation of the pigment in the ink can appropriately be suppressed.

(Aqueous Organic Solvent)

The aqueous organic solvent is an organic solvent having miscibility with water. As the aqueous organic solvent, it is preferable to use at least one selected from the group consisting of poly(n=1 or more)alkylene(C2 to 3) glycol monoalkyl ethers, poly(n=1 or more)alkylene(C2 to 3) glycol monoaryl ethers, poly(n=1 or more)alkylene(C2 to 3) glycol dialkyl ethers, alkylene diols, alkylene monool monoalkyl ethers, alkylene polyols, and amide solvents each having a solubility to water at 25° C. of 20 mass % or more.

More specific examples of the aqueous organic solvent include poly(n=1 or more)alkylene(C2 to 3) glycol monoalkyl ethers such as ethylene glycol monobutyl ether, diethylene glycol monobutyl ether, tripropylene glycol monobutyl ether, tetraethylene glycol monomethyl ether, tetraethylene glycol monobutyl ether, dipropylene glycol monomethyl ether, and tripropylene glycol monomethyl ether; poly(n=1 or more)alkylene(C2 to 3) glycol monoaryl ethers such as phenoxy triethylene glycol, and styrenated phenyl polyethylene glycols; poly(n=1 or more) alkylene (C2 to 3) glycol dialkyl ethers such as diethylene glycol dimethyl ether, diethylene glycol diethyl ether, and tetraethylene glycol dimethyl ether; alkylene diols such as 1,2-propylene glycol, 1,2-hexane diol, 1,2-octylene glycol, and isoprene glycol; alkylene monool monoalkyl ethers such as 3-methoxy-3-methylbutanol; alkylene polyols such as glycerin; and amide solvents such as 2-pyrrolidone and N-methylpyrrolidone.

The aqueous organic solvent is an essential component, and drying of the head and curling of the printed paper can be prevented by the aqueous organic solvent being contained. In addition, another organic solvent as long as the organic solvent is soluble to water can be used as necessary. Specific examples of another solvent include methanol, ethanol, ethylene carbonate, and propylene carbonate.

(Blending Ratio of Each Component)

The ratio of the pigment contained in the aqueous pigment dispersion liquid of the present invention is 5 to 35 mass %, preferably 5 to 30 mass %, more preferably 7 to 20 mass %. Moreover, the content ratio of the pigment dispersant is 0.5 to 25 mass %. Furthermore, the content ratio of the aqueous organic solvent is 5 to 30 mass %, preferably 5 to 20 mass %. Moreover, the content ratio of water is 20 to 80 mass %. The blending ratio of each component is appropriately adjusted in consideration of the quality, cost, or the like to be required. For example, it is preferable that the content ratio of the pigment is 7 to 20 mass % because the chroma, the color developing properties, and the stability are remarkably improved. In addition, when the content ratio of the pigment is too small, the print density cannot be ensured. On the other hand, when the content ratio of the pigment is too large, the viscosity of the ink is increased and the ejection stability of the ink from the inkjet head tends to be lowered. Moreover, in the case where the content ratio of the pigment is 5 to 30 mass %, it is preferable that the content ratio of the pigment dispersant is 0.5 to 20 mass %, the content ratio of the aqueous organic solvent is 10 to 30 mass %, and the content ratio of water is 50 to 70 mass %.

Moreover, the content of the pigment dispersant based on 100 mass parts of the pigment is 10 to 200 mass parts, more preferably 15 to 60 mass parts. When the content of the pigment dispersant based on 100 mass parts of the pigment is less than 10 mass parts, the dispersion stability tends to be lowered. On the other hand, when the content of the pigment dispersant based on 100 mass parts of the pigment exceeds 200 mass parts, it sometimes occurs that the viscosity of the aqueous pigment dispersion liquid is excessively increased.

(Method for Preparing Aqueous Pigment Dispersion Liquid)

The aqueous pigment dispersion liquid of the present invention can be prepared, for example, by mixing and dispersing, a pigment, a pigment dispersant, an aqueous organic solvent, and water by a conventionally known method. A disperser may be used in mixing and dispersing each component. Specific examples of the disperser include kneading machines such as a kneader, a two-roll mill, a three-roll mill, and product name "MIRACLE K.C.K." (manufactured by Asada Iron Works Co., Ltd.); an ultrasonic disperser; and high-pressure homogenizers (product name "Microfluidizer" (manufactured by Mizuho Industrial Co., Ltd.), product name "Nanomizer" (manufactured by Yoshida Kikai Co., Ltd.), product name "Starburst" (manufactured by Sugino Machine Ltd.), and product name "G-Smasher" (manufactured by RIX Corporation). Moreover, a ball mill, sand mill, horizontal type media mill disperser, colloid mill, or the like using beads media such as glass beads and zircon beads can also be used. The specific method for dispersion is not particularly limited.

In order to make the number average particle diameter (particle diameter distribution) of the pigment within the range of the desired numerical value, a method in which, for example, the size of the disintegrating media of a disperser is made small, the filling rate of the disintegrating media is made large, the processing time is made long, the ejection speed is made slow, or classifying is carried out by a filter after disintegration or a centrifugal separator can be used. Furthermore, it is also preferable to use a pigment the particle diameter of which is made small in advance by a conventionally known method such as, for example, a salt milling method.

(Method for Preparing Dispersant-Coated Pigment)

In the present invention, it is preferable to use a dispersant-coated pigment to which coating treatment is applied with a pigment dispersant, that is, a dispersant-coated pigment obtained by coating (encapsulating) the pigment with the pigment dispersant to be deposited on the surface of the pigment. By using such a dispersant-coated pigment, the dispersion stability of the pigment can further be enhanced. Namely, it becomes hard to desorb the pigment dispersant from the surface of the pigment by coating the pigment with the pigment dispersant even when a large amount of the organic solvent is mixed into the pigment dispersion liquid, and, furthermore, the dispersion stability of the pigment can be enhanced more because the polymer chain A is dissolved in water.

The dispersant-coated pigment can be prepared by the preparation method comprising, for example, (i) a step of precipitating a pigment dispersant by adding an acid to a pigment dispersion liquid obtained by mixing a pigment, the pigment dispersant, an aqueous organic solvent, water, and an alkaline agent or (ii) a step of precipitating a pigment dispersant by adding a kneaded product obtained by kneading a pigment and the pigment dispersant to a poor solvent for the pigment dispersant.

In the step (i), the pigment dispersion liquid in which the pigment is dispersed is obtained by mixing respective components by a conventionally known method. As the alkaline agent, ammonia; alkylamines such as trimethylamine and triethylamine; glycolamines such as diethanolamine and triethanolamine; cyclic amines such as morpholine and pyridine; and hydroxides such as sodium hydroxide and potassium hydroxide can be used. Next, the obtained pigment dispersion liquid is stirred using a stirrer capable of conducting stirring at a high speed such as, for example, a dissolver, and an acid is slowly added thereto. The pigment dispersant is precipitated on the surface of the pigment by adding the acid, and thereby the pigment can be coated (encapsulated) with the polymer chain B being a hydrophobic chain.

As the acid, inorganic acids such as hydrochloric acid, sulfuric acid, and nitric acid; organic acids such as acetic acid, propionic acid, and toluenesulfonic acid can be used. The acid may be added as it is, however it is preferable to add the acid in the form of a 10 mass % or less aqueous solution. Moreover, it is preferable that the addition amount of the acid is equimolar or more to the alkali which neutralizes the carboxyl group of the polymer chain A in the pigment dispersant, more preferably 1.1 or more times larger than the number of moles of the alkali.

In the step (ii), the kneaded product obtained by kneading the pigment and the pigment dispersant is added to the poor solvent for the pigment dispersant. The pigment dispersant is precipitated on the surface of the pigment by adding the kneaded product to the poor solvent for the pigment dispersant, and thereby the pigment can be coated (encapsulated) with the polymer chain B being a hydrophobic chain. As the poor solvent, a solvent that does not dissolve the polymer is used, depending on the property derived from the composition of the pigment dispersant. Specific examples of such a poor solvent include hydrocarbon solvents such as hexane, polyhydric alcohols such as ethylene glycol, and methanol.

After precipitating the pigment dispersant, the formed dispersant-coated pigment (precipitated product) is filtered. The dispersant-coated pigment (precipitated product) can be obtained in a water-paste state by conducting filtration. The water paste may be used as dried and pulverized, however it is also preferable to use the water paste as it is. Fusion between pigment dispersants due to drying is prevented and it becomes unnecessary to pulverize by using the water paste as it is, and therefore the number average particle diameter of the pigment can be maintained as it is at the time of dispersion. In addition, heating may be conducted as necessary so as to aggregate the dispersant-coated pigment after the precipitation of the pigment dispersant to thereby make it easy to filtrate. Moreover, it is preferable to sufficiently remove an ionic substance or an organic solvent adhered to the dispersant-coated pigment being a precipitated product by conducting filtration.

(Aqueous Pigment Inkjet Ink)

The aqueous pigment inkjet ink of the present invention comprises the afore-mentioned aqueous pigment dispersion liquid, and the content ratio of the pigment is 4 to 10 mass %. A vehicle component, for example, is contained as a component other than the aqueous pigment dispersion liquid in the aqueous pigment inkjet ink of the present invention. Specific examples of the vehicle component include surfactants, organic solvents, and humectants. In addition, it is preferable from the viewpoint of spreading the diameter of a dot printed by inkjet to an optimum width that the surface tension of the aqueous pigment inkjet ink is 20 to 40 mN/m. The surface tension of the aqueous pigment inkjet ink can be adjusted by adding a surfactant. As the surfactant, anionic surfactants, non-ionic surfactants, cationic surfactants, and amphoteric surfactants can be used.

Specific examples of the anionic surfactant include alkylsulfuric acid ester salts, alkylarylsulfuric acid ester salts, alkylarylsulfonic acid salts, alkylnaphthalenesulfonic acid salts, polyoxyethylene alkyl ether sulfonic acid salts, polyoxyethylene alkyl aryl ether sulfonic acid salts, naphthalene sulfonic acid/formalin condensates, polyoxyethylene alkylphosphoric acid ester salts, and polyoxyethylene alkylarylphosphoric acid ester salts. Specific examples of the non-ionic surfactant include polyoxyethylene alkyl ethers, polyoxyethylene alkylaryl ethers, polyoxyethylene/polyoxypropylene block polymers, sorbitan fatty acid esters, polyoxyethylene alkylamine ethers, fatty acid diethanoldiamides, sorbitan fatty acid esters, acetylene alcohols, and acetylene glycols. Specific examples of the cationic surfactant include alkylamine salts and quaternary ammonium salts. Specific examples of the amphoteric surfactant include alkylbetaines and amine oxides. It is preferable that the content ratio of the surfactant in the aqueous pigment inkjet ink is 0.01 to 5 mass %, more preferably 0.1 to 2 mass %. When the content ratio of the surfactant is too large, it sometimes occurs that the dispersion stability of the pigment is impaired.

EXAMPLES

Hereinafter, the present invention will specifically be described based on Examples, however the present invention is not limited to these Examples. In addition, the "parts" and the "%" in Examples and Comparative Examples are based on mass unless otherwise noted.

Synthesis of Macromonomer

Synthesis Example 1

In a reaction vessel equipped with a stirrer, a back flow condenser, a thermometer, and a nitrogen introducing tube, 500 parts of butyltriglycol (hereinafter, written as "BTG"), 72 parts of methyl methacrylate (hereinafter, written as "MMA"), 80 parts of cyclohexyl methacrylate (hereinafter, written as "CHMA"), 48 parts of methacrylic acid (hereinafter, written as "MAA"), 5 parts of ethyl-2-($\alpha$-bromomethyl) acrylate (hereinafter, written as "EBMA"), and 2 parts of 2-2'-azobis(isobutyric acid)dimethyl (hereinafter, written as "V-601") were charged. Polymerization was conducted at 75° C. for 3 hours under nitrogen bubbling, and thereafter 1 part of V-601 was added to the reaction mixture. The polymerization was conducted for further 4.5 hours to obtain a polymer solution containing a polymer (a macromonomer MM-1). The solid concentration was measured by sampling the obtained polymer solution, and the content of non-volatile components was converted into the conversion rate of polymerization by calculation to obtain a conversion rate of polymerization of 100%. Moreover, the number average molecular weight (hereinafter, written as "Mn") was 6,800, the weight average molecular weight (hereinafter, written as "Mw") was 10,900, and the polydispersity index (Mw/Mn) (hereinafter, written as "PDI") was 1.60 for the macromonomer MM-1, all measured by a refractive index detector of GPC (hereinafter, written as "RI"). Moreover, peaks were hardly observed by an ultraviolet ray absorption detector (wavelength 254 nm) (hereinafter, written as "UV detector").

After the obtained polymer solution was put into a large amount of water to precipitate the polymer, the polymer was filtrated and washed. The polymer was dissolved in THF and then put into a large amount of water again to precipitate the polymer, and thereafter the polymer was filtrated and washed. The polymer was obtained by drying in a dryer at 50° C. for 24 hours. The 1H-NMR of the obtained polymer was measured using a nuclear magnetic resonance apparatus, and, as a result thereof, the peaks of the monomers and protons in the unsaturated bond derived from EBMA were observed at 6 ppm and 6.4 ppm respectively. Therefore, the obtained polymer is considered to be a macromonomer having an unsaturated bond at the end thereof. In the following Synthesis Examples, it was confirmed by conducting similar measurements that each of the obtained polymers was a macromonomer.

Synthesis Example 2

In a reaction vessel similar to the reaction vessel used in Synthesis Example 1, 250 parts of tripropylene glycol monomethyl ether (hereinafter, written as "MFTG"), 30 parts of MMA, 40 parts of CHMA, 30 parts of MAA, 2.5 parts of EBMA, and 1 part of V-601 were charged. Polymerization was conducted at 75° C. for 3 hours under nitrogen bubbling, and thereafter 0.5 parts of V-601 was added to the reaction mixture. The polymerization was conducted for further 4.5 hours to obtain a polymer solution containing a polymer (a macromonomer MM-2). The solid concentration was measured by sampling the obtained polymer solution, and the content of non-volatile components was converted into the conversion rate of polymerization by calculation to obtain a conversion rate of polymerization of 100%. Moreover, the Mn was 6,400, the Mw was 10,200, and the PDI was 1.59 for the macromonomer MM-2.

Synthesis Example 3

In a reaction vessel similar to the reaction vessel used in Synthesis Example 1, 250 parts of tetraethylene glycol dimethyl ether (hereinafter, written as "TEDM"), 36 parts of MMA, 40 parts of 3,3,5-trimethylcyclohexyl methacrylate (hereinafter, written as "TMCHMA"), 24 parts of MAA, 2.5 parts of EBMA, and 1 part of V-601 were charged. Polymerization was conducted at 75° C. for 3 hours under nitrogen bubbling, and thereafter 0.5 parts of V-601 was added to the reaction mixture. The polymerization was conducted for further 4.5 hours to obtain a polymer solution containing a polymer (a macromonomer MM-3). The solid concentration was measured by sampling the obtained polymer solution, and the content of non-volatile components was converted into the conversion rate of polymerization by calculation to obtain a conversion rate of polymerization of 100%. Moreover, the Mn was 6,500, the Mw was 10,400, and the PDI was 1.60 for the macromonomer MM-3.

Synthesis Example 4

In a reaction vessel similar to the reaction vessel used in Synthesis Example 1, 250 parts MFTG, 36 parts of MMA, 40 parts of CHMA, 24 parts of MAA, 3.5 parts of EBMA, and 1 part of V-601 were charged. Polymerization was conducted at 75° C. for 3 hours under nitrogen bubbling, and thereafter 0.5 parts of V-601 was added to the reaction mixture. The polymerization was conducted for further 4.5 hours to obtain a polymer solution containing a polymer (a macromonomer MM-4). The solid concentration was measured by sampling the obtained polymer solution, and the content of non-volatile components was converted into the conversion rate of polymerization by calculation to obtain a conversion rate of polymerization of 100%. Moreover, the Mn was 5,400, the Mw was 8,500, and the PDI was 1.57 for the macromonomer MM-4.

Synthesis Example 5

In a reaction vessel similar to the reaction vessel used in Synthesis Example 1, 250 parts MFTG, 20 parts of MMA, 15 parts of ethyl methacrylate (hereinafter, written as "EMA"), 5 parts of hydroxyethyl methacrylate (hereinafter, written as "HEMA"), 40 parts of CHMA, 20 parts of MAA, 3.5 parts of EBMA, and 1 part of V-601 were charged. Polymerization was conducted at 75° C. for 3 hours under nitrogen bubbling, and thereafter 0.5 parts of V-601 was added to the reaction mixture. The polymerization was conducted for further 4.5 hours to obtain a polymer solution containing a polymer (a macromonomer MM-5). The solid concentration was measured by sampling the obtained polymer solution, and the content of non-volatile components was converted into the conversion rate of polymerization by calculation to obtain a conversion rate of polymerization of 100%. Moreover, the Mn was 5,700, the Mw was 9,700, and the PDI was 1.70 for the macromonomer MM-5.

Comparative Synthesis Example 1

In a reaction vessel similar to the reaction vessel used in Synthesis Example 1, 250 parts MFTG, 36 parts of MMA, 40 parts of butyl methacrylate (hereinafter, written as "BMA"), 24 parts of MAA, 2.5 parts of EBMA, and 1 part of V-601 were charged. Polymerization was conducted at 75° C. for 3 hours under nitrogen bubbling, and thereafter 0.5 parts of V-601 was added to the reaction mixture. The polymerization was conducted for further 4.5 hours to obtain a polymer solution containing a polymer (a macromonomer MM-R1). The solid concentration was measured by sampling the obtained polymer solution, and the content of non-volatile components was converted into the conversion rate of polymerization by calculation to obtain a conversion rate of polymerization of 100%. Moreover, the Mn was 6,300, the Mw was 10,000, and the PDI was 1.59 for the macromonomer MM-R1. In addition, the macromonomer MM-R1 is a macromonomer not having a cycloalkyl group.

Comparative Synthesis Example 2

In a reaction vessel similar to the reaction vessel used in Synthesis Example 1, 250 parts MFTG, 36 parts of MMA, 10 parts of ethyl methacrylate (hereinafter, written as "EMA"), 30 parts of 2-ethylhexylmethacrylate (hereinafter, written as "2EHMA"), 24 parts of MAA, 2.5 parts of EBMA, and 1 part of V-601 were charged. Polymerization was conducted at 75° C. for 3 hours under nitrogen bubbling, and thereafter 0.5 parts of V-601 was added to the reaction mixture. The polymerization was conducted for further 4.5 hours to obtain a polymer solution containing a polymer (a macromonomer MM-R2). The solid concentration was measured by sampling the obtained polymer solution, and the content of non-volatile components was converted into the conversion rate of polymerization by calculation to obtain a conversion rate of polymerization of 100%. Moreover, the Mn was 7,400, the Mw was 11,000, and the PDI was 1.49 for the macromonomer MM-R2. The macromonomer MM-R2 is a macromonomer not having a cycloalkyl group.

Details of the macromonomers obtained by Synthesis Examples 1 to 5 and Comparative Synthesis Examples 1 and 2 are shown in Table 1.

TABLE 1

|  | Macromonomer | | Solvent | Mn | Mw | PDI |
|---|---|---|---|---|---|---|
|  | Kind | (Composition) [mass ratio] | | | | |
| Synthesis Example 1 | MM-1 | (MMA/CHMA/MAA/EBMA) [36/40/24/2.5] | BTG | 6800 | 10900 | 1.60 |
| Synthesis Example 2 | MM-2 | (MMA/CHMA/MAA/EBMA) [30/40/30/2.5] | MFTG | 6400 | 10200 | 1.59 |
| Synthesis Example 3 | MM-3 | (MMA/TMCHMA/MAA/EBMA) [36/40/24/2.5] | TEDM | 6500 | 10400 | 1.60 |
| Synthesis Example 4 | MM-4 | (MMA/CHMA/MAA/EBMA) [36/40/24/3.5] | MFTG | 5400 | 8500 | 1.57 |
| Synthesis Example 5 | MM-5 | (MMA/EMA/HEMA/CHMA/MAA/EBMA) [20/15/5/40/20/3.5] | MFTG | 5700 | 9700 | 1.70 |
| Comparative Synthesis Example 1 | MM-R1 | (MMA/BMA/MAA/EBMA) [36/40/24/2.5] | MFTG | 6300 | 10000 | 1.39 |
| Comparative Synthesis Example 2 | MM-R2 | (MMA/EMA/2EHMA/MAA/EBMA) [36/10/30/24/2.5] | MFTG | 7400 | 11000 | 1.49 |

Synthesis of Graft Copolymer

Synthesis Example 6

In a reaction vessel A similar to the reaction vessel used in Synthesis Example 1, 100 parts of BTG and 600 parts of the solution of the macromonomer MM-1 were charged, and the resultant mixture was heated to 80° C. Moreover, in another reaction vessel, 200 parts of styrene (hereinafter, written as "St"), 100 parts of butyl acrylate (hereinafter, written as "BA"), and 5 parts of t-butylperoxi-2-ethylhexanoate (hereinafter, written as "PBO") were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 2.5 parts of PBO was added, the temperature was raised to 85° C., and then the polymerization was conducted for further 4 hours. To the reaction mixture, 32.3 parts of potassium hydroxide (KOH) and 467.7 parts of water were added for neutralization to obtain a polymer solution containing a polymer (a copolymer CP-1). The solid concentration was measured by sampling the obtained polymer solution, and the content of non-volatile components was converted into the conversion rate of polymerization by calculation to obtain a conversion rate of polymerization of 100%. Moreover, the Mn was 15,900, the Mw was 38,500, and the PDI was 2.42 for the copolymer CP-1. In addition, peaks corresponding to the molecular weight derived from the macromonomer were not observed. Moreover, the molecular weight was measured using the UV detector to obtain an Mn of 15,600, an Mw of 39,100, and a PDI of 2.51. It is considered that the reason is because the monomer components which constitute the polymer chain B have an aromatic ring and strong absorption has been observed. In addition, it is considered that the macromonomer MM-1 has polymerized with the monomer components which constitute the polymer chain B to increase the molecular weight and thereby the graft copolymer has been obtained. In the following Synthesis Examples, it was confirmed by conducting similar measurements that each of the obtained copolymers was a graft copolymer. Moreover, the solid concentration of the polymer solution was adjusted to 30% by adding ion exchanged water to the obtained polymer solution based on the measurement result of the solid concentration. In the following Synthesis Examples, the solid concentration of each polymer solution was also adjusted to 30% in the same manner.

Synthesis Example 7

In a reaction vessel A similar to the reaction vessel used in Synthesis Example 1, 50 parts of MFTG and 300 parts of the solution of the macromonomer MM-2 were charged, and the resultant mixture was heated to 80° C. Moreover, in another reaction vessel, 100 parts of St, 50 parts of BA, and 2.5 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of PBO was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-2). The solid concentration was measured by sampling the obtained polymer solution, and the content of non-volatile components was converted into the conversion rate of polymerization by calculation to obtain a conversion rate of polymerization of 100%. Moreover, the Mn was 14,800, the Mw was 34,200, and the PDI was 2.31 for the copolymer CP-2.

Synthesis Example 8

In a reaction vessel A similar to the reaction vessel used in Synthesis Example 1, 300 parts of the solution of the macromonomer MM-2 was charged, and the solution was heated to 80° C. Moreover, in another reaction vessel, 67 parts of St, 33 parts of BA, and 2 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1 part of PBO was added, the temperature was raised to 85° C., and then the polymerization was conducted for further 4 hours. To the reaction mixture, 16.1 parts of KOH and 183.9 parts of water were added for neutralization to obtain a polymer solution containing a polymer (a copolymer CP-3). The solid concentration was measured by sampling the obtained polymer solution, and the content of non-volatile components was converted into the conversion rate of polymerization by calculation to obtain a conversion rate of polymerization of 100%. Moreover, the Mn was 11,400, the Mw was 27,500, and the PDI was 2.41 for the copolymer CP-3.

Synthesis Example 9

In a reaction vessel A similar to the reaction vessel used in Synthesis Example 1, 300 parts of the solution of the macromonomer MM-2 was charged, and the solution was heated to 80° C. Moreover, in another reaction vessel, 67 parts of St, 33 parts of HEMA, and 2 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1 part of PBO was added, the temperature was raised to 85° C., and then the polymerization was conducted for further 4 hours. To the reaction mixture, 16.1 parts of KOH and 183.9 parts of water were added for neutralization to obtain a polymer solution containing a polymer (a copolymer CP-4). The solid concentration was measured by sampling the obtained polymer solution, and the content of non-volatile components was converted into the conversion rate of polymerization by calculation to obtain a conversion rate of polymerization of 100%. Moreover, the Mn was 10,600, the Mw was 22,800, and the PDI was 2.15 for the copolymer CP-4.

Synthesis Example 10

In a reaction vessel A similar to the reaction vessel used in Synthesis Example 1, 50 parts of TEDM and 300 parts of the solution of the macromonomer MM-3 were charged, and the resultant mixture was heated to 80° C. Moreover, in another reaction vessel, 100 parts of St, 50 parts of BA, and 2.5 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of PBO was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-5). The solid concentration was measured by sampling the obtained polymer solution, and the content of non-volatile components was converted into the conversion rate of polymerization by calculation to obtain a conversion rate of polymerization of 100%. Moreover, the Mn was 14,700, the Mw was 28,000, and the PDI was 1.90 for the copolymer CP-5.

Synthesis Example 11

In a reaction vessel A similar to the reaction vessel used in Synthesis Example 1, 50 parts of MFTG and 300 parts of the solution of the macromonomer MM-4 were charged, and the resultant mixture was heated to 80° C. Moreover, in another reaction vessel, 100 parts of St, 50 parts of BA, and 2.5 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of PBO was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-6). The solid concentration was measured by sampling the obtained polymer solution, and the content of non-volatile components was converted into the conversion rate of polymerization by calculation to obtain a conversion rate of polymerization of 100%. Moreover, the Mn was 13,100, the Mw was 29,000, and the PDI was 2.21 for the copolymer CP-6.

Synthesis Example 12

In a reaction vessel A similar to the reaction vessel used in Synthesis Example 1, 50 parts of MFTG and 300 parts of the solution of the macromonomer MM-5 were charged, and the resultant mixture was heated to 80° C. Moreover, in another reaction vessel, 67 parts of St, 33 parts of HEMA, and 2 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1 part of PBO was added, the temperature was raised to 85° C., and then the polymerization was conducted for further 4 hours. To the reaction mixture, 16.1 parts of KOH and 183.9 parts of water were added for neutralization to obtain a polymer solution containing a polymer (a copolymer CP-7). The solid concentration was measured by sampling the obtained polymer solution, and the content of non-volatile components was converted into the conversion rate of polymerization by calculation to obtain a conversion rate of polymerization of 100%. Moreover, the Mn was 9,800, the Mw was 22,200, and the PDI was 2.27 for the copolymer CP-7.

Comparative Synthesis Example 3

In a reaction vessel A similar to the reaction vessel used in Synthesis Example 1, 50 parts of MFTG and 300 parts of the solution of the macromonomer MM-R1 were charged, and the resultant mixture was heated to 80° C. Moreover, in another reaction vessel, 100 parts of St, 50 parts of BA, and 2.5 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of PBO was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-R1). The solid concentration was measured by sampling the obtained polymer solution, and the content of non-volatile components was converted into the conversion rate of polymerization by calculation to obtain a conversion rate of polymerization of 100%. Moreover, the Mn was 14,000, the Mw was 31,700, and the PDI was 2.26 for the copolymer CP-R1. The copolymer CP-R1 is a graft copolymer in which a grafted polymer does not have a cyclohexyl group.

Comparative Synthesis Example 4

In a reaction vessel A similar to the reaction vessel used in Synthesis Example 1, 50 parts of MFTG and 300 parts of the solution of the macromonomer MM-R2 were charged, and the resultant mixture was heated to 80° C. Moreover, in another reaction vessel, 100 parts of St, 50 parts of HEMA, and 2.5 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of PBO was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-R2). The solid concentration was measured by sampling the obtained polymer solution, and the content of non-volatile components was converted into the conversion rate of polymerization by calculation to obtain a conversion rate of polymerization of 100%. Moreover, the Mn was 15,600, the Mw was 37,000, and the PDI was 2.37 for the copolymer CP-R2. The copolymer CP-R2 is a graft copolymer in which a grafted polymer (the polymer chain A) does not have a cyclohexyl group.

Comparative Synthesis Example 5

In a reaction vessel A similar to the reaction vessel used in Synthesis Example 1, 50 parts of MFTG and 300 parts of the solution of the macromonomer MM-2 were charged, and the resultant mixture was heated to 80° C. Moreover, in another reaction vessel, 100 parts of MMA, 50 parts of BA, and 2.5 parts of PBO were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of PBO was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-R3). The solid concentration was measured by sampling the obtained polymer solution, and the content of non-volatile components was converted into the conversion rate of polymerization by calculation to obtain a conversion rate of polymerization of 100%. Moreover, the Mn was 10,200, the Mw was 23,000, and the PDI was 2.25 for the copolymer CP-R3. The copolymer CP-R3 is a graft copolymer in which the main chain (the polymer chain B) does not have a cyclohexyl group.

Comparative Synthesis Example 6

In a reaction vessel A similar to the reaction vessel used in Synthesis Example 1, 250 parts of MFTG was charged and heated to 80° C. Moreover, in another reaction vessel, 36 parts of MMA, 40 parts of CHMA, 24 parts of MAA, 100 parts of St, 50 parts of BA, and 7.5 parts of azobisisobutyronitrile (hereinafter, written as "AIBN") were charged and stirred well to prepare a monomer liquid. A half of the monomer liquid was added to the reaction vessel A, and thereafter the other half of the monomer liquid was slowly dropped in 1 hour to the reaction vessel A. After the completion of the dropping, polymerization was conducted for 3 hours. Then, 1.25 parts of AIBN was added, the temperature was raised to 85° C., and then the polymerization was conducted for further 4 hours. To the reaction mixture, 16.2 parts of KOH and 233.8 parts of water were added for neutralization to obtain a polymer solution containing a polymer (a copolymer CP-R4). The solid concentration was measured by sampling the obtained polymer solution, and the content of non-volatile components was converted into the conversion rate of polymerization by calculation to obtain a conversion rate of polymerization of 100%. Moreover, the Mn was 14,700, the Mw was 30,600, and the PDI was 2.08 for the copolymer CP-R4. The copolymer CP-R4 is a random copolymer.

The details of the copolymers obtained by Synthesis Examples 6 to 12 and Comparative Examples 3 to 6 are shown in Table 2.

TABLE 2

| | Copolymer | | | | | |
|---|---|---|---|---|---|---|
| | Kind | (Composition) [mass ratio] | Solvent | Mn | Mw | PDI |
| Synthesis Example 6 | CP-1 | (MM-1/St/RA) [40/40/20] | BTG | 15900 | 38500 | 2.42 |
| Synthesis Example 7 | CP-2 | (MM-2/St/BA) [40/40/20] | MFTG | 14800 | 34200 | 2.31 |
| Synthesis Example 8 | CP-3 | (MM-2/St/BA) [50/33/17] | MFTG | 11400 | 27500 | 2.41 |
| Synthesis Example 9 | CP-4 | (MM-2/St/HEMA) [50/33/17] | MFTG | 10600 | 22800 | 2.15 |
| Synthesis Example 10 | CP-5 | (MM-3/St/BA) [40/40/20] | TEDM | 14700 | 28000 | 1.90 |
| Synthesis Example 11 | CP-6 | (MM-4/St/BA) [40/40/20] | MFTG | 13100 | 29000 | 2.21 |
| Synthesis Example 12 | CP-7 | (MM-5/St/HEMA) [50/33/17] | MFTG | 9800 | 22200 | 2.27 |
| Comparative Synthesis Example 3 | CP-R1 | (MM-R1/St/BA) [40/40/20] | MFTG | 14000 | 31700 | 2.26 |
| Comparative Synthesis Example 4 | CP-R2 | (MM-R2/St/HEMA) [40/40/20] | MFTG | 15600 | 37000 | 2.37 |
| Comparative Synthesis Example 5 | CP-R3 | (MM-2/MMA/BA) [40/40/20] | MFTG | 10200 | 23000 | 2.25 |
| Comparative Synthesis Example 6 | CP-R4 | (MMA/CHMA/MAA/St/BA) [14/16/10/40/20] | MFTG | 14700 | 30600 | 2.08 |

Synthesis of Block Copolymer

Synthesis Example 13

In a reaction vessel similar to the reaction vessel used in Synthesis Example 1, 173 parts of MFTG, 1.0 part of iodine, 3.7 parts of 2,2'-azobis(4-methoxy-2,4-dimethylvaleronitrile) (hereinafter, written as "V-70"), 42 parts of CHMA, 17.6 parts of benzyl methacrylate (hereinafter, written as "BzMA"), and 0.17 parts of diphenylmethane (hereinafter, written as "DPM") were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 86%. The Mn was 5,000 and the PDI was 1.19 for the polymer contained in the polymer solution. Next, the polymer solution was cooled to 40° C., then 16.8 parts of CHMA, 20 parts of MMA, 12.9 parts of MAA, and 1.5 parts of V-70 were added to the polymer solution, and the polymerization was conducted for 3.5 hours. To the reaction mixture, 8.4 parts of KOH and 49.2 parts of water were added for neutralization to obtain a polymer solution containing a polymer (a block copolymer BP-1). The solid concentration was measured by sampling the obtained polymer solution, and the content of non-volatile components was converted into the conversion rate of polymerization by calculation to obtain a conversion rate of polymerization of 100%. Moreover, the Mn was 10,300 and the PDI was 1.30 for the copolymer BP-1. In addition, the solid concentration of the polymer solution was adjusted to 30% by adding ion exchanged water to the obtained polymer solution based on the measurement result of the solid concentration. In the following Synthesis Examples, the solid concentration of each polymer solution was also adjusted to 30% in the same manner.

Synthesis Example 14

In a reaction vessel similar to the reaction vessel used in Synthesis Example 1, 174 parts of MFTG, 1.0 part of iodine, 3.7 parts of V-70, 29.4 parts of CHMA, 30.8 parts of BzMA, and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 82%. Moreover, the Mn was 5,700 and the PDI was 1.20 for the polymer contained in the polymer solution. Next, the polymer solution was cooled to 40° C., then 16.8 parts of TMCHMA, 20 parts of MMA, 12.9 parts of MAA, and 1.5 parts of V-70 were added to the polymer solution, and the polymerization was conducted for 3.5 hours. To the reaction mixture, 8.4 parts of KOH and 49.2 parts of water were added for neutralization to obtain a polymer solution containing a polymer (a block copolymer BP-2). The solid concentration was measured by sampling the obtained polymer solution, and the content of non-volatile components was converted into the conversion rate of polymerization by calculation to obtain a conversion rate of polymerization of 100%. Moreover, the Mn was 10,300 and the PDI was 1.31 for the block copolymer BP-2.

Synthesis Example 15

In a reaction vessel similar to the reaction vessel used in Synthesis Example 1, 168 parts of MFTG, 1.0 part of iodine, 3.7 parts of V-70, 42 parts of CHMA, 17.6 parts of BzMA, and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 80%. Moreover, the Mn was 5,000 and the PDI was 1.17 for the polymer contained in the polymer solution. Next, the polymer solution was cooled to 40° C., then 8.4 parts of CHMA, 25 parts of MMA, 12.9 parts of MAA, and 1.4 parts of V-70 were added to the polymer solution, and the polymerization was conducted for 3.5 hours. To the reaction mixture, 8.4 parts of KOH and 47.6 parts of water were added for neutralization to obtain a polymer solution containing a polymer (a block copolymer BP-3). The solid concentration was measured by sampling the obtained polymer solution, and the content of non-volatile components was converted into the conversion rate of polymerization by calculation to obtain a conversion rate of polymerization of 100%. Moreover, the Mn was 9,100 and the PDI was 1.31 for the block copolymer BP-3.

Synthesis Example 16

In a reaction vessel similar to the reaction vessel used in Synthesis Example 1, 168 parts of MFTG, 1.0 part of iodine, 3.7 parts of V-70, 42 parts of CHMA, 13 parts of hydroxyethyl methacrylate (hereinafter, written as "HEMA"), and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 81%. Moreover, the Mn was 5,100 and the PDI was 1.22 for the polymer contained in the polymer solution. Next, the polymer solution was cooled to 40° C., then 16.8 parts of CHMA, 20 parts of MMA, 12.9 parts of MAA, and 1.5 parts of V-70 were added to the polymer solution, and the polymerization was conducted for 3.5 hours. To the reaction mixture, 8.4 parts of KOH and 47.6 parts of water were added for neutralization to obtain a polymer solution containing a polymer (a block copolymer BP-4). The solid concentration was measured by sampling the obtained polymer solution, and the content of non-volatile components was converted into the conversion rate of polymerization by calculation to obtain a conversion rate of polymerization of 100%. Moreover, the Mn was 9,600 and the PDI was 1.33 for the block copolymer BP-4.

Synthesis Example 17

In a reaction vessel similar to the reaction vessel used in Synthesis Example 1, 173 parts of BTG, 1.0 part of iodine, 3.7 parts of V-70, 42 parts of CHMA, 17.6 parts of BzMA, and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 89%. Moreover, the Mn was 6,000 and the PDI was 1.18 for the polymer contained in the polymer solution. Next, the polymer solution was cooled to 40° C., then 16.8 parts of CHMA, 20 parts of MMA, 12.9 parts of MAA, and 1.5 parts of V-70 were added to the polymer solution, and the polymerization was conducted for 3.5 hours. To the reaction mixture, 6.0 parts of NaOH and 51.6 parts of water were added for neutralization to obtain a polymer solution containing a polymer (a block copolymer BP-5). The solid concentration was measured by sampling the obtained polymer solution, and the content of non-volatile components was converted into the conversion rate of polymerization by calculation to obtain a conversion rate of polymerization of 100%. Moreover, the Mn was 11,100 and the PDI was 1.29 for the block copolymer BP-5.

Synthesis Example 18

In a reaction vessel similar to the reaction vessel used in Synthesis Example 1, 172 parts of TEDM, 1.0 part of iodine, 3.7 parts of V-70, 58.8 parts of CHMA, and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 84%. Moreover, the Mn was 5,200 and the PDI was 1.19 for the polymer contained in the polymer solution. Next, the polymer solution was cooled to 40° C., then 16.8 parts of CHMA, 20 parts of MMA, 12.9 parts of MAA, and 1.5 parts of V-70 were added to the polymer solution, and the polymerization was conducted for 3.5 hours. To the reaction mixture, 9.1 parts of 28% aqueous ammonia solution and 48.2 parts of water were added for neutralization to obtain a polymer solution containing a polymer (a block copolymer BP-6). The solid concentration was measured by sampling the obtained polymer solution, and the content of non-volatile components was converted into the conversion rate of polymerization by calculation to obtain a conversion rate of polymerization of 100%. Moreover, the Mn was 10,000 and the PDI was 1.31 for the block copolymer BP-6.

Synthesis Example 19

In a reaction vessel similar to the reaction vessel used in Synthesis Example 1, 169 parts of 3-methoxy-3-methyl-1-butanol (hereinafter, written as "MMB"), 1.0 part of iodine, 3.7 parts of V-70, 42 parts of CHMA, 14.2 parts of BMA, and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 88%. Moreover, the Mn was 4,800 and the PDI was 1.16 for the polymer contained in the polymer solution. Next, the polymer solution was cooled to 40° C., then 16.8 parts of CHMA, 20 parts of MMA, 12.9 parts of MAA, and 1.5 parts of V-70 were added to the polymer solution, and the polymerization was conducted for 3.5 hours. To the reaction mixture, 8.4 parts of KOH and 47.6 parts of water were added for neutralization to obtain a polymer solution containing a polymer (a block copolymer BP-7). The solid concentration was measured by sampling the obtained polymer solution, and the content of non-volatile components was converted into the conversion rate of polymerization by calculation to obtain a conversion rate of polymerization of 100%. Moreover, the Mn was 9,500 and the PDI was 1.29 for the block copolymer BP-7.

Comparative Synthesis Example 7

In a reaction vessel similar to the reaction vessel used in Synthesis Example 1, 128 parts of MFTG, 1.0 part of iodine, 3.7 parts of V-70, 52.2 parts of BzMA, 9.8 parts of HEMA and 0.17 parts of DPM were charged. Polymerization was conducted at 45° C. for 5.5 hours under nitrogen bubbling to obtain a polymer solution. The solid concentration was measured by sampling the obtained polymer solution, and the content of non-volatile components was converted into the conversion rate of polymerization by calculation to obtain a conversion rate of polymerization of 80%. Moreover, the Mn was 4,900 and the PDI was 1.26 for the polymer contained in the polymer solution. Next, the polymer solution was cooled to 40° C., then 20.8 parts of MMA, 40.8 parts of BMA, 15.0 parts of MAA, and 2.3 parts of V-70 were added to the polymer solution, and the polymerization was conducted for 3.5 hours. To the reaction mixture, 9.8 parts of KOH and 32.8 parts of water were added for neutralization to obtain a polymer solution containing a polymer (a block copolymer BP-R1). The solid concentration was measured by sampling the obtained polymer solution, and the content of non-volatile components was converted into the conversion rate of polymerization by calculation to obtain a conversion rate of polymerization of 100%. Moreover, the Mn was 9,200 and the PDI was 1.57 for the block copolymer BP-R1.

Comparative Synthesis Example 8

In a reaction vessel A similar to the reaction vessel used in Synthesis Example 1, 375 parts of MFTG was charged and heated to 80° C. Moreover, in another reaction vessel, 110 parts of CHMA, 70 parts of BzMA, 40 parts of MMA, 30 parts of MAA, and 12 parts of azobisisobutyronitrile (hereinafter, written as "AIBN") were charged and stirred well to prepare a monomer liquid. A half of the monomer liquid was added to the reaction vessel A, and the other half of the monomer liquid was slowly dropped in 1 hour to the reaction vessel A. After the completion of the dropping, polymerization was conducted for 3 hours. Then, 1.5 parts of AIBN was added, the temperature was raised to 85° C., and then the polymerization was conducted for further 4 hours. To the reaction mixture, 19.6 parts of KOH and 105.4 parts of water were added for neutralization to obtain a polymer solution containing a polymer (a random copolymer RP-R1). The solid concentration was measured by sampling the obtained polymer solution, and the content of non-volatile components was converted into the conversion rate of polymerization by calculation to obtain a conversion rate of polymerization of 100%. Moreover, the Mn was 12,100 and the PDI was 2.28 for the random copolymer RP-R1.

The details of the copolymers obtained by Synthesis Examples 13 to 19 and Comparative Synthesis Examples 7 and 8 are shown in Table 3.

TABLE 3

| | Copolymer | | | | |
|---|---|---|---|---|---|
| | Kind | Composition [mass ratio] | Solvent | Mn | PDI |
| Synthesis Example 13 | BP-1 | B(CHMA/BzMA)-A(CHMA/MMA/MAA) [B(70/30)-A(34/40/26)] B:A = 54.5:45.5 | MFTG | 10300 B: 5000 A: 5300 | 1.30 |
| Synthesis Example 14 | BP-2 | B(CHMA/BzMA)-A(TMCHMA/MMA/MAA) [B(48.3/51.7)-A(34/40/26)] B:A = 54.5:45.5 | MFTG | 10300 B: 5700 A: 4600 | 1.31 |
| Synthesis Example 15 | BP-3 | B(CHMA/BzMA)-A(CHMA/MMA/MAA) [B(70/30)-A(17.4/54.3/28.3)] B:A = 47.2:52.8 | MFTG | 9100 B: 5000 A: 4100 | 1.31 |

TABLE 3-continued

| | | Copolymer | | | |
|---|---|---|---|---|---|
| | Kind | Composition [mass ratio] | Solvent | Mn | PDI |
| Synthesis Example 16 | BP-4 | B(CHMA/HEMA)-A(CHMA/MMA/MAA) [B(76.4/23.6)-A(34/40/26)] B:A = 52.4:47.6 | MFTG | 9600 B: 5100 A: 4500 | 1.33 |
| Synthesis Example 17 | BP-5 | B(CHMA/BzMA)-A(CHMA/MMA/MAA) [B(70/30)-A(34/40/26)] B:A = 45.5:54.5 | BTG | 11100 B: 6000 A: 5100 | 1.29 |
| Synthesis Example 18 | BP-6 | B(CHMA)-A(CHMA/MMA/MAA) [B(100)-A(34/40/26)] B:A = 54.1:45.9 | TEDM | 10000 B: 5200 A: 4800 | 1.31 |
| Synthesis Example 19 | BP-7 | B(CHMA/BMA)-A(CHMA/MMA/MAA) [B(75/25)-A(34/40/13)] B:A = 52.8:47.2 | MMB | 9500 B: 4800 A: 4700 | 1.29 |
| Comparative Synthesis Example 7 | BP-R1 | B(BzMA/HEMA)-A(MMA/BMA/MAA) [B(83.9/16.1)-A(34/40/13)] B:A = 45:55 [B(52/10)-A(61/15)] | MFTG | 9200 B: 4900 A: 4300 | 1.57 |
| Comparative Synthesis Example 8 | RP-R1 | (CHMA/BzMA/MMA/MAA) [44/28/16/121 | MFTG | 12100 | 2.28 |

Aqueous Pigment Dispersion Liquid

Example 1

A translucent solution having some cloudiness was obtained by mixing 233.3 parts of the polymer solution containing the copolymer CP-1 obtained by Synthesis Example 6, 70 parts of diethylene glycol monobutyl ether, and 311.7 parts of water. To the solution, 350 parts of an azo yellow pigment PY-74 (product name "SEIKA FAST YELLOW 2016G" manufactured by Dainichiseika Color & Chemicals Mfg. Co., Ltd.) was added, and the resultant mixture was stirred using a disper mixer for 30 minutes to prepare a mill base. Dispersion treatment was applied using a horizontal type medium disperser (product name "DYNO-MILL 0.6L ECM TYPE" manufactured by Shinmaru Enterprises Corp., zirconia beads; diameter 0.5 mm) at a peripheral speed of 10 m/s, and the pigment was sufficiently dispersed in the mill base. Thereafter, 316 parts of water was added to the resultant mixture to make a pigment concentration of 18%. Centrifugal separation treatment was applied (7500 rpm for 20 minutes) to the mill base taken out from the disperser, and thereafter filtration was conducted with a 10 μm membrane filter. The filtrate was diluted with water to obtain an aqueous pigment dispersion liquid 1 for inkjet having a pigment concentration of 14%.

The number average particle diameter of the pigment contained in the obtained aqueous pigment dispersion liquid 1 was measured by a particle diameter measurement apparatus (product name "NICOMP 380 ZLS-S"), manufactured by PSS Inc.) to obtain a number average particle diameter of 122 nm, and it was confirmed that the pigment was finely dispersed. Moreover, the aqueous pigment dispersion liquid 1 had a viscosity of 3.1 mPa·s and a pH of 8.9. When the aqueous pigment dispersion liquid 1 was stored at 70° C. for 1 week, the number average particle diameter of the pigment became 122 nm and the viscosity became 3.0 mPa·s, and it was confirmed that the storage stability was extremely favorable.

Examples 2 to 14 and Comparative Examples 1 to 6

Aqueous pigment dispersion liquids 2 to 20 were obtained in the same manner as in Example 1 described above except that the dispersants shown in Table 4 were used. The evaluation results of the obtained aqueous pigment dispersion liquids 2 to 20 are shown in Table 4.

TABLE 4

| | Aqueous pigment dispersion liquid | Pigment dispersant | pH | Initial | | After storage at 70° C. for 1 week | |
|---|---|---|---|---|---|---|---|
| | | | | Number average particle diameter (nm) | Viscosity (mPa · s) | Number average particle diameter (nm) | Viscosity (mPa · s) |
| Example 1 | 1 | CP-1 | 8.9 | 122 | 3.1 | 122 | 3.0 |
| Example 2 | 2 | CP-2 | 9.0 | 112 | 3.2 | 111 | 2.9 |
| Example 3 | 3 | CP-3 | 8.9 | 103 | 2.9 | 103 | 2.8 |
| Example 4 | 4 | CP-4 | 8.8 | 103 | 3.0 | 101 | 3.2 |
| Example 5 | 5 | CP-5 | 8.9 | 123 | 3.3 | 123 | 3.2 |
| Example 6 | 6 | CP-6 | 8.8 | 115 | 2.9 | 117 | 3.1 |
| Example 7 | 7 | CP-7 | 8.9 | 100 | 3.8 | 102 | 3.7 |
| Example 8 | 8 | BP-1 | 8.9 | 123 | 2.8 | 122 | 2.9 |
| Example 9 | 9 | BP-2 | 8.7 | 120 | 3.0 | 123 | 3.2 |
| Example 10 | 10 | BP-3 | 8.9 | 105 | 2.9 | 107 | 3.2 |
| Example 11 | 11 | BP-4 | 8.8 | 118 | 3.2 | 118 | 3.2 |
| Example 12 | 12 | BP-5 | 9.0 | 99 | 3.6 | 100 | 3.4 |
| Example 13 | 13 | BP-6 | 9.0 | 120 | 3.0 | 120 | 3.0 |
| Example 14 | 14 | BP-7 | 8.8 | 122 | 3.0 | 121 | 3.2 |
| Comparative Example 1 | 15 | CP-R1 | 8.9 | 122 | 2.9 | 120 | 2.8 |
| Comparative Example 2 | 16 | CP-R2 | 8.9 | 103 | 2.7 | 105 | 2.7 |
| Comparative Example 3 | 17 | CP-R3 | 8.9 | 156 | 2.3 | 189 | 39.0 |
| Comparative Example 4 | 18 | CP-R4 | 8.8 | 140 | 3.3 | 222 | >100 |
| Comparative Example 5 | 19 | BP-R1 | 9.0 | 123 | 3.2 | 123 | 2.9 |
| Comparative Example 6 | 20 | RP-R1 | 9.0 | 155 | 3.6 | 233 | >100 |

In the aqueous pigment dispersion liquids 2 to 16 and 19 obtained by Examples 2 to 14 and Comparative Examples 1, 2, and 5 respectively were, in the same way as in the aqueous pigment dispersion liquid obtained by Example 1, the pigment was finely dispersed and the storage stability was favorable. In addition, in the aqueous pigment dispersion liquids 15, 16, and 19 obtained by Comparative Examples 1, 2, and 5 respectively, the pigment dispersants which were the same as in Examples except that a cycloalkyl group was not contained in the structure thereof were used, and therefore it is considered that the dispersibility and the storage stability has been improved.

On the other hand, regarding the aqueous pigment dispersion liquid of Comparative Example 3 using the copolymer CP-R3 not having an aromatic ring and a cycloalkyl group in the polymer chain B (main chain), the viscosity became high during dispersion and it became difficult to take out the pigment dispersion liquid, and therefore it was necessary to lower the pigment concentration by diluting the dispersion liquid with water. Moreover, the dispersibility was poor, the number average particle diameter of the pigment was large, and the storage stability was not favorable. It is inferred that the reason for this is because the adsorptivity of the polymer chain B (main chain) to the pigment is poor.

Moreover, in the aqueous pigment dispersion liquids of Comparative Examples 4 and 6 using the copolymer CP-R4 and the random copolymer RP-R1 respectively, the dispersibility was favorable, however the pigment particles were aggregated during storage and the fluidity was remarkably lowered. It is considered that the reason for this is because one molecule of the pigment dispersant was adsorbed on a plurality of the pigment particles by using, as a dispersant, the copolymer having an indefinite and random structure in which copolymer parts to be adsorbed are randomly present in the molecular chain and as a result thereof the dispersion did not proceed well, and because the pigment dispersant was not adsorbed to the pigment due to the remarkable solvent effect caused by heating and as a result thereof the pigments were aggregated. It is considered that, in the molecular structure of the pigment dispersant used in Examples, the parts to be adsorbed to the pigment and the parts capable of being dissolved in a solvent are clearly separated in block units and thereby the dispersion of the pigment has proceeded well and, simultaneously, the aggregation of pigments has been suppressed by the steric effect of the parts capable of being dissolved in a solvent and thereby the storage stability has been improved.

In addition, blue aqueous pigment dispersion liquids, red aqueous pigment dispersion liquids, and black aqueous pigment dispersion liquids were prepared in the same manner as in the afore-mentioned Examples 1 to 14 and Comparative Examples 1 to 6 except that a copper phthalocyanine pigment PB-15:3 (product name "CYANINE BLUE A220JC" manufactured by Dainichiseika Color & Chemicals Mfg. Co., Ltd.), a quinacridone pigment PR-122 (product name "CFR130P" manufactured by Dainichiseika Color & Chemicals Mfg. Co., Ltd), and a carbon black pigment PB-7 (product name "S170" manufactured by Degussa) were used in place of the azo yellow pigment PY-74. As a result thereof, in any of the aqueous pigment dispersion liquids obtained using the copolymers CP-1 to CP-7, block copolymers BP-1 to BP-7, CP-R1, CP-R2, and BP-R1, the dispersibility and the storage stability were favorable in the same way as in the yellow pigment dispersion liquid.

Aqueous Pigment Ink (1)

Example 15

An aqueous pigment inkjet ink was prepared according to the following formulation using the aqueous pigment dispersion liquid 1 prepared by Example 1.

| | |
|---|---|
| Aqueous pigment dispersion liquid 1 | 40 parts |
| Water | 42.2 parts |
| 1,2-hexanediol | 5 parts |
| Glycerin | 10 parts |

The compound having the above formulation was sufficiently stirred, and thereafter filtration was conducted with a membrane filter having a pore size of 10 μm to prepare an aqueous pigment ink 1. The number average particle diameter of the pigment contained in the aqueous pigment ink 1 was measured to obtain a number average particle diameter of 119 nm. Moreover, the aqueous pigment ink 1 had a viscosity of 2.9 mPa·s. When the aqueous pigment ink 1 was stored at 70° C. for 1 week, the number average particle diameter of the pigment became 118 nm, the viscosity became 2.8 mPa·s, and it was confirmed that the storage stability was extremely favorable. It is inferred that the reason for this is because the hydrophobic parts to be adsorbed of the pigment dispersant is adsorbed to the pigment without being detached from the pigment and thereby the storage stability has been improved.

Examples 16 to 28 and Comparative Examples 7 to 9

Aqueous pigment inks 2 to 16 and 19 were obtained in the same manner as in the afore-mentioned Example 15 except that the pigment dispersion liquids shown in Table 5 were used. Moreover, the afore-mentioned blue aqueous pigment dispersion liquids, red aqueous pigment dispersion liquids, and black aqueous pigment dispersion liquids were used respectively to prepare respective color aqueous pigment inks. In any of the aqueous pigment inks, it was confirmed that the storage stability was favorable.

Each of the aqueous pigment inks 1 to 16 and 19 was filled into a cartridge and printed using an inkjet printer (product name "EM 930C" manufactured by Seiko Epson Corp.) with a print mode of photo 720 dpi on (i) dedicated glossy photo paper (PGPP), (ii) plain paper (product name "4024" manufactured by Xerox Corp.), and (iii) dedicated photo matte paper to obtain a printed matter. As a result thereof, it was confirmed that any of the aqueous pigment inks was capable of being ejected from nozzles of inkjet without problem.

The obtained printed matters were evaluated using an optical densitometer (product name "Macbeth RD-914" manufactured by Gretag Macbeth). In addition, with regard to the dedicated glossy photo paper (PGPP), the value of optical density OD, the chroma C*, the 200 gloss, and the 600 were evaluated. Moreover, with regard to the plain paper and the dedicated photo matte paper, the value of optical density OD and chroma C* were measured 5 times respectively to determine the respective average values. The measurement results are shown in Table 5.

TABLE 5

|  | Aqueous pigment ink | PGPP | | | | 4024 | | Photo matte paper | |
| --- | --- | --- | --- | --- | --- | --- | --- | --- | --- |
|  |  | OD | C* | 20° gloss | 60° gloss | OD | C* | OD | C* |
| Example 15 | 1 | 1.86 | 115.6 | 34.6 | 72.2 | 1.10 | 87.2 | 1.44 | 105.8 |
| Example 16 | 2 | 1.88 | 115.3 | 36.7 | 71.0 | 1.10 | 87.4 | 1.45 | 105.5 |
| Example 17 | 3 | 1.88 | 115.9 | 38.9 | 74.1 | 1.14 | 87.0 | 1.45 | 105.6 |
| Example 18 | 4 | 1.87 | 115.6 | 39.3 | 75.1 | 1.10 | 87.5 | 1.43 | 105.6 |
| Example 19 | 5 | 1.90 | 115.3 | 40.1 | 72.7 | 1.21 | 89.3 | 1.45 | 105.7 |
| Example 20 | 6 | 1.88 | 115.7 | 40.3 | 73.3 | 1.15 | 89.0 | 1.44 | 108.4 |
| Example 21 | 7 | 1.86 | 115.6 | 38.2 | 72.0 | 1.12 | 88.5 | 1.41 | 106.6 |
| Example 22 | 8 | 1.85 | 115.6 | 36.6 | 73.7 | 1.14 | 88.6 | 1.41 | 106.6 |
| Example 23 | 9 | 1.88 | 115.9 | 35.1 | 72.3 | 1.13 | 87.1 | 1.42 | 107.0 |
| Example 24 | 10 | 1.87 | 115.4 | 38.2 | 73.9 | 1.10 | 88.5 | 1.43 | 106.3 |
| Example 25 | 11 | 1.89 | 115.5 | 39.3 | 76.0 | 1.16 | 88.0 | 1.44 | 105.8 |
| Example 26 | 12 | 1.87 | 115.4 | 37.7 | 73.7 | 1.10 | 87.3 | 1.43 | 105.5 |
| Example 27 | 13 | 1.89 | 115.8 | 38.2 | 71.2 | 1.14 | 87.6 | 1.42 | 105.6 |
| Example 28 | 14 | 1.90 | 115.8 | 40.1 | 72.7 | 1.18 | 88.9 | 1.45 | 106.7 |
| Comparative Example 7 | 15 | 1.75 | 113.1 | 25.3 | 67.4 | 1.07 | 86.2 | 1.37 | 104.4 |
| Comparative Example 8 | 16 | 1.69 | 108.3 | 24.9 | 63.6 | 1.06 | 86.8 | 1.35 | 103.5 |
| Comparative Example 9 | 19 | 1.85 | 112.1 | 28.0 | 64.9 | 1.10 | 86.3 | 1.39 | 103.9 |

It is understood from the results shown in Table 5 that any of the aqueous pigment inks prepared using the aqueous pigment dispersion liquid comprising, as a pigment dispersant, a graft copolymer or block copolymer in which a cycloalkyl group is introduced in the polymer chain A is excellent in the color developing property and the chroma in every case where the printing is conducted on any of the paper sheets. Moreover, in the case where the printing is conducted on the dedicated glossy photo paper (PGPP), it is understood that the 20° gloss and the 60° gloss are high.

In addition, the tests were conducted in the same manner for each color aqueous pigment ink prepared using each of the afore-mentioned blue aqueous pigment dispersion liquids, red aqueous pigment dispersion liquids, and black pigment dispersion liquids. As a result thereof, it was confirmed that the color developing property, the chroma, and the gloss became high for every case where any of the inks was used.

Aqueous Pigment Ink (2)

Example 29

A uniform solution was obtained by mixing 164 parts of a polymer solution containing the block copolymer BP-1 obtained by Synthesis Example 13, 80 parts of BDG, and 356 parts of water. To the obtained solution, 200 parts of a red pigment (C.I. Pigment Red 122 (dimethyl quinacridone pigment manufactured by Dainichiseika Color and Chemicals Mfg. Co., Ltd.), and deflocculation was conducted using a disper mixer to prepare a mill base. To 800 parts of the obtained mill base, 3200 parts of water was added so that the pigment content became 5%, and thereafter 5% acetic acid was dropped to the resultant mixture under stirring to precipitate the pigment dispersant. The pH before dropping the acetic acid (initial) was 9.5, and the pH after dropping the acetic acid was 4.5. Filtration and washing with water were conducted to obtain paste of a dispersant-coated pigment (the concentration of the solid: 32.0%).

A solution in which 667 parts of the obtained paste, 9.4 parts of BDG, and 1.15 parts of sodium hydroxide were dissolved in 62.2 parts of water was mixed and stirred. Next, the obtained mixture was dispersed again using a horizontal type medium disperser. The dispersed mixture was further dispersed using an ultra-high pressure homogenizer (product name "Microfluidizer" manufactured by Microfluidics) at a pressure of 150 MPa by three passes. Centrifugal separation treatment (7500 rpm for 20 minutes) was applied to the dispersed mixture, thereafter filtration was conducted with a 10 µm membrane filter, and then ion exchanged water was added to the filtrate to obtain a red aqueous pigment dispersion liquid 1 having a pigment concentration of 14%. The number average particle diameter of the pigment contained in the obtained red aqueous pigment dispersion liquid 1 was measured to obtain a number average particle diameter of 108 nm. Moreover, the red aqueous pigment dispersion liquid 1 had a viscosity of 2.22 mPa·s. When the red aqueous pigment dispersion liquid 1 was stored at 70° C. for 1 week, changes in particle diameter of the pigment and viscosity were not observed, and it was confirmed that the storage stability was favorable.

To 40 parts of the red aqueous pigment dispersion liquid 1, 60 parts of a liquid mixture of 1.8 parts of BDG, 5 parts of 1,2-hexanediol, 10 parts of glycerin, 1 part of "SURFYNOL 465" (product name manufactured by Air Products and Chemicals, Inc.), and 42.2 parts of water was added. After the resultant mixture was sufficiently stirred, the filtration was conducted with membrane filter having a pore size of 10 µm to obtain a red aqueous pigment inkjet ink. The number average particle diameter of the pigment particles contained in the obtained red aqueous pigment ink was 114 nm. Moreover, the red aqueous pigment ink had a viscosity of 3.06 mPa·s.

Examples 30 to 32

Each color aqueous pigment dispersion liquid and each color aqueous pigment inkjet ink were obtained in the same manner as in the afore-mentioned Example 29 except that (i) an azo yellow pigment PY-74 (product name "SEIKA FAST YELLOW 2016G" manufactured by Dainichiseika Color & Chemicals Mfg. Co., Ltd.), (ii) a copper phthalocyanine pigment PB-15:3 (product name "CYANINE BLUE A220JC" manufactured by Dainichiseika Color & Chemicals Mfg. Co., Ltd.), and (iii) a carbon black pigment PB-7 (product name "S170" manufactured by Degussa) were respectively used in place of the red pigment, and that the formulation of the inks were made as shown in Table 6.

TABLE 6

|  | Example 29 | Example 30 | Example 31 | Example 32 (Unit: parts) |
|---|---|---|---|---|
| Red aqueous pigment dispersion liquid 1 | 40 | | | |
| Blue aqueous pigment dispersion liquid 1 | | 26.7 | | |
| Black aqueous pigment dispersion liquid 1 | | | 40 | |
| Yellow aqueous pigment dispersion liquid 1 | | | | 40 |
| BDG | 1.8 | 1.8 | 1.8 | 1.8 |
| 1,2-Hexanediol | 5 | 5 | 5 | 5 |
| Glycerin | 10 | 10 | 10 | 10 |
| Surfynol 465 | 1 | 1 | 1 | 1 |
| Ion exchanged water | 42.2 | 55.5 | 42.2 | 42.2 |
| Total amount | 100 | 100 | 100 | 100 |

The measurement results of the number average particle diameter of the pigment and the viscosity (initial and after storage at 70° C. for 1 week) for each of the color aqueous pigment inks obtained by Examples 29 to 32 are shown in Table 7. Each of the color aqueous pigment inks was filled into a cartridge and printed using an inkjet printer (product name "EM 930C" manufactured by Seiko Epson Corp.) with a print mode of photo 720 dpi on plain paper (product name "4024" manufactured by Xerox Corp.) to obtain printed matters. The print density of each of the printed matters was measured 5 times to calculate the average value. The results are shown in Table 7.

TABLE 7

|  | Initial | | After storage at 70° C. for 1 week | | |
|---|---|---|---|---|---|
|  | Number average particle diameter (nm) | Viscosity (mPa·s) | Number average particle diameter (nm) | Viscosity (mPa·s) | Print density |
| Example 29 | 114 | 3.06 | 114 | 2.9 | 1.11 |
| Example 30 | 91 | 2.8 | 91 | 2.7 | 1.12 |
| Example 31 | 130 | 5 | 137 | 4.9 | 1.21 |
| Example 32 | 120 | 2.9 | 121 | 2.3 | 1.16 |

As shown in Table 7, it was proved that the pigments which were coated (encapsulated) with a pigment dispersant also showed favorable dispersibility and storage stability. It is inferred that the reason for this is because the pigment dispersant is not peeled even by the solvent by the hydrophobic polymer chain B coating the pigment and, further, the water soluble polymer chain A is dissolved in water to prevent the aggregation by steric effect. Moreover, it was confirmed that the printing with high print density was able to be conducted. It is considered that the reason for this is because the pigment which is coated (encapsulated) with a pigment dispersant is hard to be penetrated in the paper and has been left on the surface of the paper.

In addition, the head cleaning operation was conducted once after the ejection was made impossible by drying the inkjet head at 45° C. for 24 hours after printing. As a result thereof, ejection was able to be conducted without problem in every case where any of the inks was used. Namely, it is clear that even if the ink is dried, the dried matter is capable of being dissolved and dispersed again, namely, it is clear that the redissolvability and the redispersibility of the inks are favorable. It is considered that the reason for this is because the polymer chain A containing a carboxyl group forms an ion and is easily dissolved in a liquid medium such as water even when the polymer is dried.

INDUSTRIAL APPLICABILITY

By using the aqueous pigment dispersion liquid of the present invention, an aqueous pigment inkjet ink that is excellent in ejection properties and long term storage stability, is capable of being easily redispersed and redissolved even when the ink is dried on the head, and is capable of producing a printed matter in which the color developing property and the light resistance are improved while the chroma and the gloss are maintained at a high level can be provided.

The invention claimed is:

1. An aqueous pigment dispersion liquid for inkjet comprising:
    a pigment in a range from 5 to 35 mass %;
    a pigment dispersant in a range from 0.5 to 25 mass %;
    an aqueous organic solvent, which is an organic solvent having miscibility with water, in a range from 5 to 30 mass %; and
    water in a range from 20 to 80 mass %,
    wherein the pigment dispersant comprises a graft copolymer in which a polymer chain A is grafted onto a polymer chain B,
    the polymer chain A comprises:
        a constituent unit derived from a first cycloalkyl group-containing (meth)acrylate in a range from 20 to 60 mass %;
        a constituent unit derived from (meth)acrylic acid in a range from 10 to 35 mass %; and
        a constituent unit derived from another (meth)acrylate in a range from 5 to 70 mass %, and
    the polymer chain A has a number average molecular weight in a range from 1,000 to 10,000,
    the polymer chain B comprises at least one material selected from the group consisting of a constituent unit derived from a second cycloalkyl group-containing (meth)acrylate, a constituent unit derived from a vinyl monomer having an aromatic ring, and a constituent unit derived from (meth)acrylate having an aromatic ring,
        wherein the second cycloalkyl group-containing (meth)acrylate for the polymer chain B is selected from the group consisting of cyclohexyl (meth)acrylate, methylcyclohexyl (meth)acrylate, 3,3,5-trimethylcyclohexyl (meth)acrylate, t-butylcyclohexyl (meth)acrylate, cyclohexyloxyethyl (meth)acrylate, and tricyclodecyl (meth)acrylate, isobornyl (meth)acrylate,
    the vinyl monomer having an aromatic ring for the polymer chain B is selected from the group consisting of styrene, vinyl toluene, and vinyl naphthalene, and
    the (meth)acrylate having an aromatic ring for the polymer chain B is selected from the group consisting of phenyl (meth)acrylate, naphthoxy (meth)acrylate, benzyl (meth)acrylate, phenoxy ethyl (meth)acrylate, and para-cumyl phenol ethylene oxide-modified (meth)acrylate,
    a mass ratio A:B of the polymer chain A to the polymer chain B is in a range of 30 to 70:70 to 30, and
    the graft copolymer has a number average molecular weight in a range from 2,000 to 20,000.

2. The aqueous pigment dispersion liquid according to claim 1,
wherein the pigment is at least one material selected from the group consisting of Color Index number (C.I.) Pigment Blue 15:3 and 15:4, C.I. Pigment Red 122 and 269, C.I. Pigment Violet 19, C.I. Pigment Yellow 74, 155, and 180, C.I. Pigment Green 36 and 58, C.I. Pigment Orange 43, and C.I. Pigment Black 7, and
the pigment has a number average primary particle diameter of less than 150 nm.

3. The aqueous pigment dispersion liquid according to claim 1,
wherein the aqueous organic solvent has a solubility to water of 20 mass % or more at 25° C., and
the aqueous organic solvent is at least one material selected from the group consisting of poly(n=1 or more)alkylene (C2 to 3) glycol monoalkyl ethers, poly(n=1 or more) alkylene(C2 to 3) glycol monoaryl ethers, poly(n=1 or more)alkylene(C2 to 3) glycol dialkyl ethers, alkylene diols, alkylene monool monoalkyl ethers, alkylene polyols, and amide solvents.

4. The aqueous pigment dispersion liquid according to claim 1, wherein the pigment is coated with the pigment dispersant.

5. The aqueous pigment dispersion liquid according to claim 1, wherein the first cycloalkyl group-containing (meth) acrylate is at least one material of cyclohexyl (meth)acrylate and 3,3,5-trimethylcyclohexyl (meth)acrylate.

6. An aqueous pigment inkjet ink comprising the aqueous pigment dispersion liquid according to claim 1, wherein a content ratio of the pigment in the aqueous pigment inkjet ink is in a range from 4 to 10 mass %.

7. A method for preparing a dispersant-coated pigment, in which a coating treatment using a pigment dispersant is applied to a pigment, comprising:
(i) a step of precipitating the pigment dispersant by adding an acid to a pigment dispersion liquid obtained by mixing the pigment, the pigment dispersant, an aqueous organic solvent, which is an organic solvent having miscibility with water, water, and an alkaline agent, or
(ii) a step of precipitating the pigment dispersant by adding a kneaded product obtained by kneading the pigment and the pigment dispersant into a poor solvent for the pigment dispersant,
wherein the pigment dispersant comprises a graft copolymer in which a polymer chain A is grafted onto a polymer chain B;
the polymer chain A comprises:
a constituent unit derived from a first cycloalkyl group-containing (meth)acrylate in a range from 20 to 60 mass %;
a constituent unit derived from (meth)acrylic acid in a range from 10 to 35 mass %; and
a constituent unit derived from another (meth)acrylate in a range from 5 to 70 mass %, and
the polymer chain A has a number average molecular weight in a range from 1,000 to 10,000,
the polymer chain B comprises at least one material selected from the group consisting of a constituent unit derived from a second cycloalkyl group-containing (meth)acrylate, a constituent unit derived from a vinyl monomer having an aromatic ring, and a constituent unit derived from (meth)acrylate having an aromatic ring,
wherein the second cycloalkyl group-containing (meth) acrylate for the polymer chain B is selected from the group consisting of cyclohexyl (meth)acrylate, methylcyclohexyl (meth)acrylate, 3,3,5-trimethylcyclohexyl (meth)acrylate, t-butylcyclohexyl (meth)acrylate, cyclohexyloxyethyl (meth)acrylate, and tricyclodecyl (meth)acrylate, isobornyl (meth)acrylate,
the vinyl monomer having an aromatic ring for the polymer chain B is selected from the group consisting of styrene, vinyl toluene, and vinyl naphthalene, and
the (meth)acrylate having an aromatic ring for the polymer chain B is selected from the group consisting of phenyl (meth)acrylate, naphthoxy (meth)acrylate, benzyl (meth)acrylate, phenoxy ethyl (meth)acrylate, and para-cumyl phenol ethylene oxide-modified (meth)acrylate,
a mass ratio A:B of the polymer chain A to the polymer chain B is in a range of 30 to 70:70 to 30, and
the graft copolymer has a number average molecular weight in a range from 2,000 to 20,000.

8. An aqueous pigment dispersion liquid for inkjet comprising:
a pigment in a range from 5 to 35 mass %;
a pigment dispersant in a range from 0.5 to 25 mass %;
an aqueous organic solvent, which is an organic solvent having miscibility with water, in a range from 5 to 30 mass %; and
water in a range from 20 to 80 mass %,
wherein the pigment dispersant comprises a block copolymer in which one end of a polymer chain A is linked to one end of a polymer chain B,
the polymer chain A comprises:
a constituent unit derived from a first cycloalkyl group-containing (meth)acrylate in a range from 28.9 to 60 mass %;
a constituent unit derived from (meth)acrylic acid in a range from 10 to 35 mass %; and
a constituent unit derived from another (meth)acrylate in a range from 5 to 70 mass %, and
the polymer chain A has a number average molecular weight in a range from 1,000 to 10,000,
the polymer chain B comprises at least one material selected from the group consisting of a constituent unit derived from a second cycloalkyl group-containing (meth)acrylate, a constituent unit derived from a vinyl monomer having an aromatic ring, and a constituent unit derived from (meth)acrylate having an aromatic ring,
a mass ratio A:B of the polymer chain A to the polymer chain B is in a range of 30 to 70:70 to 30, and
the block copolymer has a number average molecular weight in a range from 2,000 to 20,000.

9. The aqueous pigment dispersion liquid according to claim 8,
wherein the pigment is at least one material selected from the group consisting of Color Index number (C.I.) Pigment Blue 15:3 and 15:4, C.I. Pigment Red 122 and 269, C.I. Pigment Violet 19, C.I. Pigment Yellow 74, 155, and 180, C.I. Pigment Green 36 and 58, C.I. Pigment Orange 43, and C.I. Pigment Black 7, and
the pigment has a number average primary particle diameter of less than 150 nm.

10. The aqueous pigment dispersion liquid according to claim 8,
wherein the aqueous organic solvent has a solubility to water of 20 mass % or more at 25° C., and
the aqueous organic solvent is at least one material selected from the group consisting of poly(n=1 or more)alkylene (C2 to 3) glycol monoalkyl ethers, poly(n=1 or more) alkylene(C2 to 3) glycol monoaryl ethers, poly(n=1 or more)alkylene(C2 to 3) glycol dialkyl ethers, alkylene diols, alkylene monool monoalkyl ethers, alkylene polyols, and amide solvents.

11. The aqueous pigment dispersion liquid according to claim 8, wherein the pigment is coated with the pigment dispersant.

12. The aqueous pigment dispersion liquid according to claim 8, wherein the first cycloalkyl group-containing (meth) acrylate is at least any one material of cyclohexyl (meth) acrylate and 3,3,5-trimethylcyclohexyl (meth)acrylate.

13. An aqueous pigment inkjet ink comprising the aqueous pigment dispersion liquid according to claim 8, wherein a content ratio of the pigment in the aqueous pigment inkjet ink is in a range from 4 to 10 mass %.

14. A method for preparing a dispersant-coated pigment, in which a coating treatment using a pigment dispersant is applied to a pigment, comprising:
   (i) a step of precipitating the pigment dispersant by adding an acid to the pigment dispersion liquid obtained by mixing a pigment, the pigment dispersant, an aqueous organic solvent, which is an organic solvent having miscibility with water, water, and an alkaline agent, or
   (ii) a step of precipitating the pigment dispersant by adding a kneaded product obtained by kneading the pigment and the pigment dispersant into a poor solvent for the pigment dispersant, wherein the pigment dispersant comprises a block copolymer in which one end of a polymer chain A is linked to one end of a polymer chain B;

the polymer chain A comprises:
   a constituent unit derived from a first cycloalkyl group-containing (meth)acrylate in a range from 28.9 to 60 mass %;
   a constituent unit derived from (meth)acrylic acid in a range from 10 to 35 mass %; and
   a constituent unit derived from another (meth)acrylate in a range from 5 to 70 mass %, and the polymer chain A has a number average molecular weight in a range from 1,000 to 10,000, the polymer chain B comprises at least one material selected from the group consisting of a constituent unit derived from a second cycloalkyl group-containing (meth)acrylate, a constituent unit derived from a vinyl monomer having an aromatic ring, and a constituent unit derived from (meth)acrylate having an aromatic ring, a mass ratio A:B of the polymer chain A to the polymer chain B is in a range of 30 to 70:70 to 30, and the block copolymer has a number average molecular weight in a range from 2,000 to 20,000.

* * * * *